(12) United States Patent
Shah et al.

(10) Patent No.: US 11,671,657 B2
(45) Date of Patent: Jun. 6, 2023

(54) METHOD AND APPARATUS FOR SHARED VIEWING OF MEDIA CONTENT

(71) Applicant: Rovi Guides, Inc., San Jose, CA (US)

(72) Inventors: Akshay Chetan Shah, Mumbai (IN); Padmassri Chandrashekar, Karnataka (IN); Daina Emmanuel, Bangalore (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/363,300

(22) Filed: Jun. 30, 2021

(65) Prior Publication Data
US 2023/0007342 A1 Jan. 5, 2023

(51) Int. Cl.
*H04N 21/442* (2011.01)
*H04N 21/4788* (2011.01)
*H04N 21/439* (2011.01)
*H04N 21/4223* (2011.01)

(52) U.S. Cl.
CPC ... *H04N 21/44218* (2013.01); *H04N 21/4223* (2013.01); *H04N 21/439* (2013.01); *H04N 21/4788* (2013.01)

(58) Field of Classification Search
CPC ......... H04N 21/44218; H04N 21/4223; H04N 21/439; H04N 21/4788; H04N 21/4532; H04N 21/632; H04N 21/42203; G06K 9/00302
USPC .......................................................... 725/12
See application file for complete search history.

(56) References Cited

U.S. PATENT DOCUMENTS

| 2008/0059578 A1 | 3/2008 | Albertson et al. |
| 2011/0067061 A1* | 3/2011 | Karaoguz ............. G06F 3/0428 725/38 |
| 2011/0246908 A1* | 10/2011 | Akram ............... H04N 21/4788 715/752 |
| 2012/0206554 A1 | 8/2012 | Garcia et al. |

(Continued)

FOREIGN PATENT DOCUMENTS

| CN | 103238135 A * | 8/2013 | ......... G06F 3/04883 |
| WO | WO-2014186662 A1 * | 11/2014 | ........... H04N 21/233 |
| WO | 2017209978 A1 | 12/2017 | |

OTHER PUBLICATIONS

Montagud, M., Li, J., Cernigliario, G., El Ali, A., Fernandez, S., and Cesar, P., "Towards SocialVR: Evaluating a Novel Technology for Watching Videos Together", <i>arXiv e-prints</i>, 2021 (Year: 2021).*

*Primary Examiner* — Cynthia M Fogg
(74) *Attorney, Agent, or Firm* — Haley Guiliano LLP

(57) ABSTRACT

In systems and methods for enhancing group watch experiences, a first user's reaction is detected using multiple sensors, e.g., at least one camera and a microphone, and may be combined with context information to determine an action to perform at user equipment devices of other users participating in the group watch to convey the first user's reaction. Images from the at least one camera can be used to determine a portion of the screen to which the user's reaction is directed and/or another user to whom the reaction is directed. The reaction may be conveyed using one or more of an audio effect, a visual effect, haptic effect or text, e.g., to highlight the determined portion or user, display an icon and/or output an audio or video clip. A signal for providing haptic feedback may be transmitted to the user equipment device of the determined user.

18 Claims, 11 Drawing Sheets

(56) References Cited

U.S. PATENT DOCUMENTS

| | | | |
|---|---|---|---|
| 2013/0055143 A1* | 2/2013 | Martin | G06F 3/0425 |
| | | | 345/157 |
| 2013/0304820 A1 | 11/2013 | Vasquez et al. | |
| 2014/0096167 A1* | 4/2014 | Lang | H04N 21/4788 |
| | | | 725/91 |
| 2014/0258880 A1* | 9/2014 | Holm | H04L 65/40 |
| | | | 715/748 |
| 2016/0142767 A1* | 5/2016 | Shigeta | H04N 21/4788 |
| | | | 725/12 |
| 2017/0041658 A1* | 2/2017 | Mattingly | H04L 9/40 |
| 2018/0027307 A1 | 1/2018 | Ni et al. | |
| 2020/0296147 A1* | 9/2020 | Eliason | H04L 65/403 |
| 2021/0266621 A1* | 8/2021 | Marten | H04L 65/762 |
| 2021/0390364 A1* | 12/2021 | Marggraff | H04N 21/4333 |
| 2022/0070524 A1* | 3/2022 | Iyer | H04N 21/242 |

* cited by examiner

METHOD AND APPARATUS FOR SHARED VIEWING OF MEDIA CONTENT

BACKGROUND

Embodiments of the disclosure relate generally to methods and systems for group watching live or on-demand media content or other shared viewing activities.

Consumption of media content in home environments has risen in recent times. This rise has been driven, in part, by increases in the number of channels available through broadcast, cable and satellite systems and in the number of streaming services. It is not always possible, however, for a group of viewers to gather together to view the content. For instance, a group of friends might like to watch a sports event or movie together but cannot gather in the same physical location, for example, due to travelling distances between their locations and/or restrictions on indoor gatherings. While it may be possible to use screen-sharing or videoconferencing to allow a group of viewers at different locations to watch the same content together, applications and functionality dedicated to shared viewing have become available.

In a shared viewing activity, such as a group watch session, a plurality of viewers can watch media content at the same time, regardless of their respective locations. At least some degree of synchronization between the playback of the content on the devices used by the viewers to view the content is provided, for example using a group watch application implemented on the viewers' respective media devices. In particular, playback operations instigated by one or more of the viewers, such as pausing, rewinding, fast-forwarding or skipping content, is replicated in the playback of the content to the other viewers in the group.

When using screen-sharing, videoconferencing or group watch applications, interactions between the viewers in the group are limited. For example, where screen-sharing is used, the viewers may need to rely on separate communication methods, such as e-mails, text messages, or group calls, in order to communicate with one another, while a group watch application may limit interaction between users to, say, a chat window. The effectiveness with which the above techniques emulate an experience of multiple viewers interacting with one another while watching a program in the same physical location is therefore limited.

SUMMARY

Embodiments of this disclosure include methods and systems for transmitting user actions and providing feedback during a shared viewing activity to convey live user reactions to the media content being watched between users in a group. Such methods and systems may use a shared viewing application implemented on user devices to view the content, such as a group watch application. The shared viewing application may be a stand-alone application or may be a software module that is part of another application, such as an interactive television application, media guidance application, videocall application or videoconferencing application.

The shared viewing application or software module uses the output from one or more sensors monitoring a first user in the group and, optionally, context information regarding the first user and/or the media content, to determine a reaction of the first user to be conveyed to one or more other users in the group. The sensors may, for example, detect one or more of the user's speech, gestures, verbal cues, or facial expressions to determine a reaction to be conveyed and, optionally, one or more other users in the group to whom the reaction may be directed. Such embodiments may facilitate enhanced interaction between the users taking part in the shared viewing activity.

A plurality of sensors may be used to capture visual data and audio data of a user reaction, such as speech, a physical gesture, verbal cue or facial expression, of at least one of the users in the group. A corresponding action is determined based on the captured data and, optionally, context information, and the corresponding action is then performed at a user device of at least one of the other users in the group. For example, a first user in a group viewing a televised soccer match may point at a portion of a display in which a particular player is shown and make a verbal remark giving an opinion that the ball should be passed to that player. That pointing action is detected by a plurality of cameras. Images output from the plurality of cameras may be used to derive three-dimensional visual data for determining the portion of the display to which the first user is pointing. An audio sensor receives the first user's verbal remark and outputs a corresponding signal. The signal output from the audio sensor is processed to interpret the remark by determining the opinion given by the first user and, optionally, a user in the group to which the remark is to be directed or the name of the player. Based on the three-dimensional visual data and audio data, that portion of the display in which that player is shown may be highlighted on the display devices of one or more other users in the group to provide additional context for the first user's opinion, in a similar manner to how the first user pointing at the display would convey that reaction to other viewers if they had gathered at the first user's physical location, while the first user's opinion is conveyed in audio or visual form.

In some embodiments, gestures of one of the users in the group are identified from the captured three-dimensional visual data, and/or other data indicative of that user's movements, and a corresponding emoji, text, audio clip, video filter, video clip, image or meme is presented to the other users in the group. For example, if the first user were to cheer a goal in a soccer match, an audio or visual indication of a celebration, such as an audio clip of cheering, a celebratory emoji, or a celebratory message may be presented on the displays of one or more of the other users. For example, a celebratory image may be presented to selected users in the group based on whether their profile information indicates that those users support the team that has scored a goal.

The plurality of sensors may alternatively, or additionally, be used to identify a second user to whom the first user is referring or directing a comment. For example, images or avatars of the users in the group may be displayed alongside the content. Where the first user wishes to direct a comment to a second user in the group, the first user may point to the image of that user, and three-dimensional visual data obtained from the plurality of cameras may be used to identify which of the other users is being pointed to. In another embodiment, the first user may be watching the content on a media device having a touch-screen display, and may indicate the second user by tapping on their image. A comment or reaction from the first user may then be conveyed to that second user. Alternatively, or additionally, based on the context information or other input from the first user, the second user may be highlighted in the displays of the other users in the group, for example by applying an image filter to an image, video or avatar of the second user.

In some embodiments, if the first user wished to mock one of the other users, for example, a second user who supports another team, the first user's reaction to an event such as that team missing a penalty kick may take the form of sending an icon, image, meme, message, audio clip or video clip to the user device of the second user and, optionally, user devices of the other users in the group. For example, a mocking message may be presented to selected users in the group based on whether their profile information indicates that those users support the other team.

In some embodiments, a haptic device may be used to convey a tactile reaction from one user to another. For example, where a first user makes a gesture of nudging another user or tapping the other user on the shoulder to get their attention, a haptic device may be used to convey a corresponding physical sensation to the other user. The haptic device may be a device worn by the second user, such as a smartwatch, a device that the second user is watching the content on, such as a tablet, or another device associated with the second user, such as a smartphone.

The application or software module may also provide betting/game functionality, in where the first and second users can assert different outcomes of an event, such as a first team to score a goal in the match or what the outcome of a particular play might be. These assertions can be detected by processing the output signal of the audio sensor to identify keywords or concepts relating to the bet. The application or software module may then determine the outcome from metadata or through analyzing audio or video components of the media content and display or output reactions to at least the first and second users indicating which of them made a correct assertion.

Such methods and systems may be used to enhance shared viewing activities such as group watch sessions, in which media content is played to multiple users of respective user equipment devices. The playing of the media content may be synchronized. Playback operations requested by one, some or all of the users, such as rewinding, pausing, skipping, fast-forwarding or other trickplay functions, are performed by all of the respective user equipment devices. The media content may be live media content or on-demand media content. Other shared viewing activities in which the above methods and systems may be used include videocalls, videoconferences, screen-sharing or multi-player games.

BRIEF DESCRIPTION OF THE FIGURES

The above and other objects and advantages of the disclosure will be apparent upon consideration of the following detailed description, taken in conjunction with the accompanying drawings, in which like reference characters refer to like parts throughout, and in which.

DETAILED DESCRIPTION

Example methods and systems for transmitting user feedback and actions in a shared viewing activity will now be described.

Figure 1:
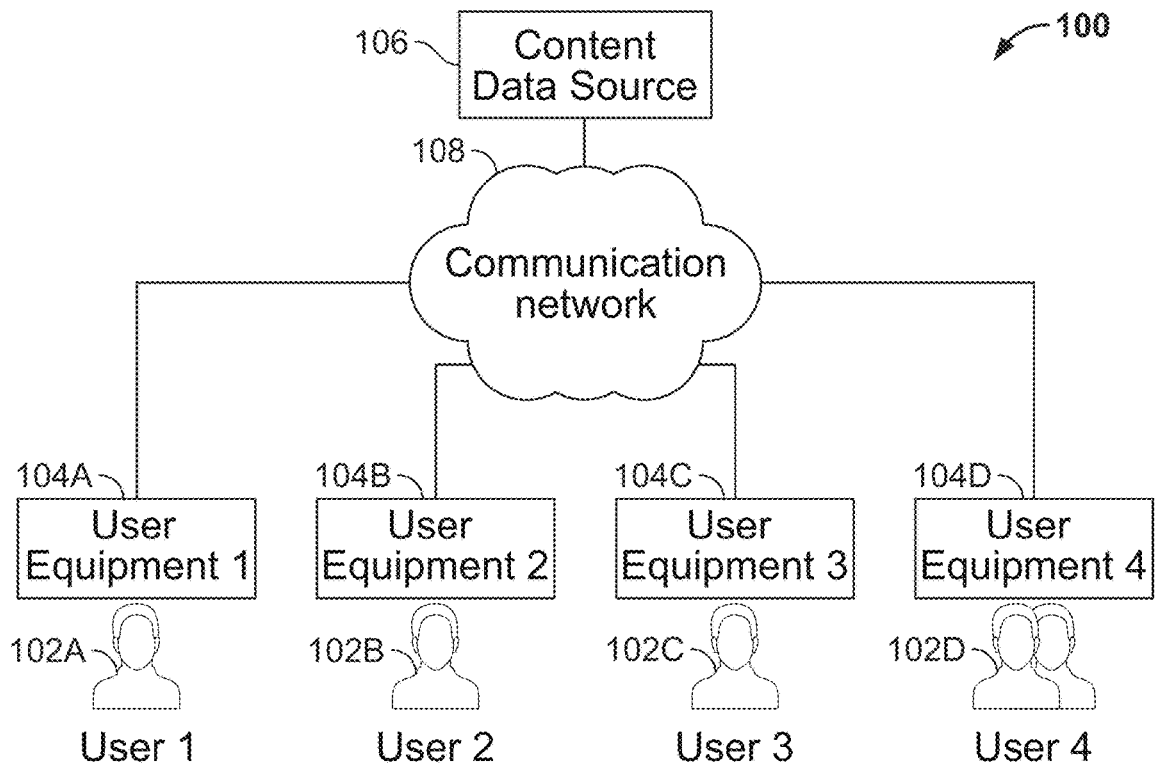
FIG. 1 depicts a system for shared viewing activity in accordance with some embodiments of the invention.

FIG. 1 depicts an example of a system 100 for providing shared viewing of media content in accordance with embodiments of the invention in which a group of users 102a-d are watching media content on respective user equipment devices 104a-d. Examples of suitable user equipment devices 104a-d include, but are not limited to, a smart television, a tablet device, a smartphone, a device such as a set-top box or streaming device connected to a display device, a 3D headset or virtual reality display equipment.

The user equipment devices 104a-d receive the same media content from a content source 106 via a communication network 108. Examples of content sources 106 include video-on-demand servers, streaming services, network digital video recorders or other device that can communicate with the user equipment devices 104a-d via the network 108. Examples of media content include a television program, a recording of media content, streamed media content or an online video game. In this example, the communication network 108 is the Internet.

Although only one communications network 108 is shown in the example of FIG. 1, in other embodiments the user equipment devices 104a-d may receive the media content via a first communication network 108 and communicate with other user equipment devices 104a-104d via a second communication network (not shown). For example, the user equipment devices 104a-d may receive the media content via a first communications network, such as a cable or broadcast network, and communicate with each other via a second communication network, such as the Internet.

Figure 2:
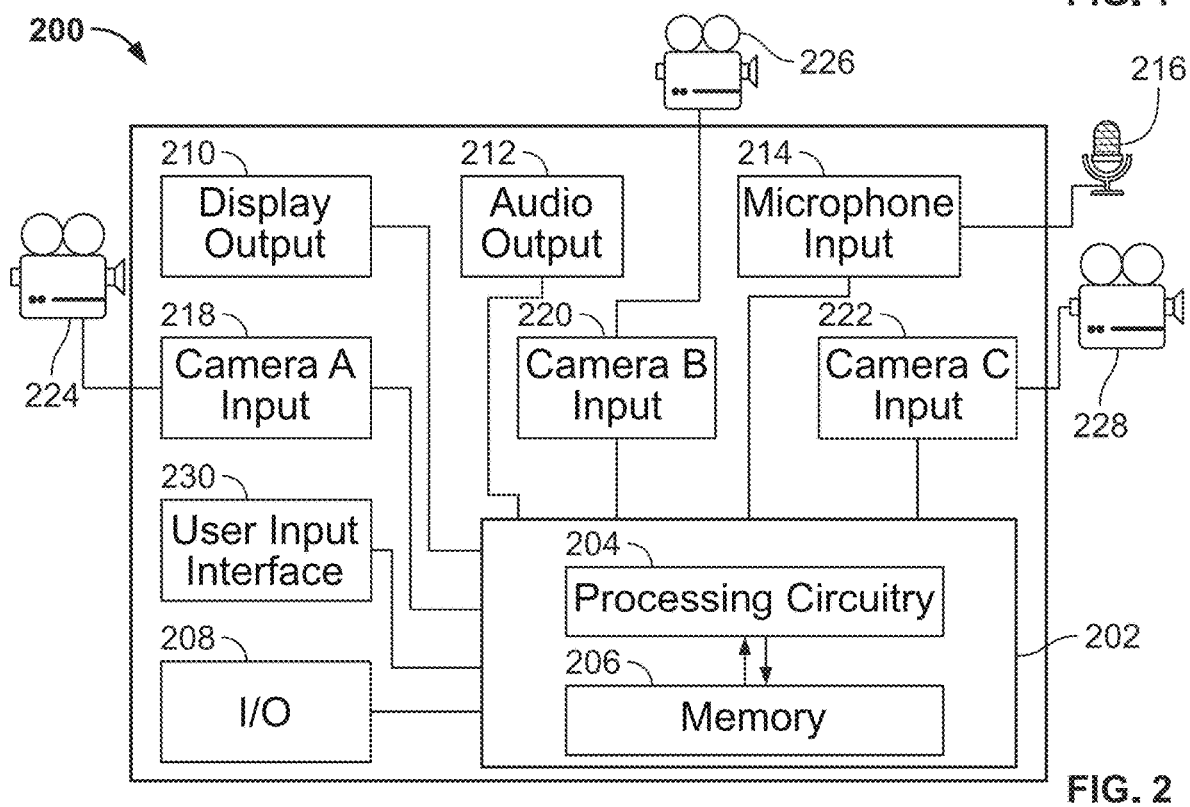
FIG. 2 is a block diagram of a user equipment device in the system of FIG. 1.

An example of a user equipment device 200 for use in the system 100 is depicted in FIG. 2. The user equipment device 200 includes control circuitry 202, which comprises processing circuitry 204 and a memory 206 that stores, at least, a computer program that, when executed by the processing circuitry 204, provides a shared viewing application. The processing circuitry 204 may be based on one or more microprocessors, microcontrollers, digital signal processors, programmable logic devices, etc. The memory 206 may be random-access memory, read-only memory, or any other suitable memory.

The control circuitry 202 is arranged to receive media content via the communication network 108 through input/output path 208, and generates for display a video component of the media content. In addition, the control circuitry 202 is arranged to generate and send data conveying reactions of the user of the user equipment device 200 to other users in the group and to receive, and generate for display, data conveying user reactions from other user equipment devices 104b-d in the group via the input/output path 208.

The control circuitry 202 is arranged to provide the video component and received data conveying the reactions of other users for display via display output 210. The display output 210 may be configured to be connected, via a wired or wireless connection, to an external display device, such as a television or monitor (not shown), or may be an integrated display, such as a touch-screen display.

The control circuitry 202 is also arranged to generate for output, via audio output 212, an audio component of the media content. The display output 210 may be configured to be connected, via a wired or wireless connection, to an external audio output device, such as a television, monitor, speaker or headphones (not shown), and/or one or more speakers integrated into the user equipment device 200.

The control circuitry 202 is also arranged to receive input from a plurality of sensors. In the example shown in FIG. 2, the user equipment device 200 includes a microphone input 214 that is arranged to receive audio input signals via an integrated or external microphone 216. The control circuitry 202 is also arranged to receive still and/or video images via at least one input 218, 220, 222 from a respective camera 224, 226, 228. The camera, or cameras, may be integrated into the user equipment device 200, external cameras connected to the user equipment device 200, or a combination thereof.

The user equipment device 200 also includes a user input interface 230 for receiving commands and requests from a user, for example, to control playing and selection of media content using a remote control device (not shown). Such a remote control device may be connected to the user equipment device 200 via a wireless connection, such as an infra-red, Wi-Fi, BLUETOOTH or other suitable connection. Alternatively, or additionally, the microphone 216 and microphone input 214 may be used to receive voice input for controlling the user equipment device 200, in which case the processing circuitry 204 may perform natural language processing to determine the user's command from the voice input and perform a corresponding action.

Figure 3A:
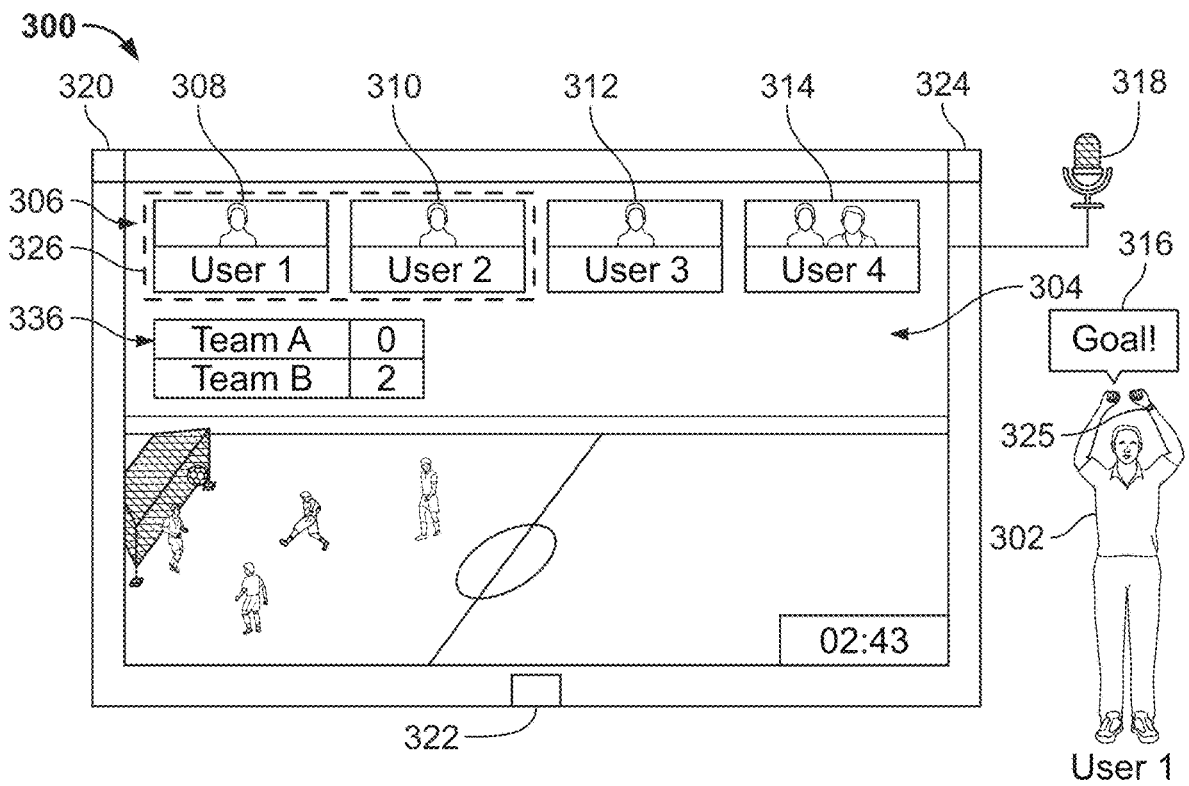
FIGS. 3A & 3B depict an example of a display of media content enhanced with a user reaction.

FIG. 3A depicts an example of a display screen for use in a shared viewing experience and a user reaction, according to some embodiments. In this example, a group of users are participating in a group watch session of media content in the form of a soccer match. The display screen, shown on a user equipment device 300 of a first user 302 in the group, presents the media content in a main display portion 304 and a gallery 306 of images 308, 310, 312, 314 showing video or avatars of the users in the group.

In the example shown in FIG. 3A, the first user 302 is cheering in response to a goal in the soccer match. The reaction of the first user 302 is detected by the user equipment 300. For example, an audible cheer or exclamation 316 from the first user 302 may be detected by a microphone 318 that is connected to, or integrated into, the user equipment 300.

The user equipment device 300 includes, or is connected to, one or more cameras 320, 322, 324. One of these cameras may be used to obtain the video 308 of the first user 302 shown in the gallery of images 308, 310, 312, 314. The video of the first user 302 captured by the one or more cameras 320, 322, 324 is analyzed to detect certain physical gestures. In the example shown in FIG. 3A, a gesture in which the first user 302 raises his arms is detected from the captured videos.

In this particular example, movements of the first user 302 are also monitored based on data received from a device 325 worn, or held, by the first user 302. For example, the first user 302 may be wearing a smartwatch that includes an accelerometer or gyroscope that outputs data indicative of the first user's movements and transmits it to the user equipment device 300, for example, via the communication network 108 or via another connection such as a Wi-Fi or Bluetooth link. Alternatively, or additionally, the first user 302 may be holding a smartphone, not shown, that includes an accelerometer or gyroscope that can provide data indicative of the first user's movements to the user equipment device 300 in a similar manner.

The control circuitry of the user equipment 300 then uses the video captured by the cameras 320, 322, 324 and/or data from other sensors, and combines it with context information to determine whether to cause an action to be performed at the user equipment devices of some, or all, of the other users in the group based on the first user's reaction. In this particular case, the videos of the first user 302 raising his hands, or data indicative of such a movement received from a wearable or handheld device 325, may be combined with one or more of the audible cheer or exclamation from the first user 302, metadata provided with the media content, analysis of the video component of the media content, analysis of the user's gestures of facial expression, or user profile information indicating that the first user 302 supports one of the teams playing in the soccer match to determine that the first user's gesture is a celebration of an event in the soccer match. Such user profile information may be, for example, a viewing history of the first user 302, a social media profile of the first user 302, or other profile information. In this example, if the user profile information indicates that the user supports Team A and it can be determined, from a change to the score displayed in a scoreboard 336 shown in the display screen, text in a ticker included in the media content, the exclamation from the first user 302 or from metadata accompanying the media content that Team A has just scored, then the control circuitry may determine that the first user 302 is celebrating a goal and that data corresponding to that reaction is to be sent to the user equipment devices of the other users in the group. Alternatively, or additionally, the control circuitry may undertake natural language processing or other voice processing to extract a keyword, such as "Goal!" from the first user's cheer or exclamation 316, and that keyword may be included in the context information.

The control circuitry may then determine, based on the received video input and/or audio or data received via other sensors, and based on the context information, an action to be performed at the user equipment devices of the other users in the group. In this particular example, the control circuitry determines that celebratory text, such as "GOAL!", should be overlaid onto the media content 304 to convey the first user's reaction. Optionally, the control circuitry may determine an audio clip of the exclamation 316 of user 1 should be played if the audio of the first user's exclamation has not already been conveyed to the other user equipment devices as part of the shared viewing activity. In other embodiments, a different audio clip, such as celebratory music, may be included in the message or identified by a title or location in the message so that the other user equipment devices can retrieve the clip from local or external storage and play it. A .gif file, emoji, icon, image or video clip may be provided instead of, or as well as, the celebratory text.

The control circuitry of the user equipment device 300 then sends a message requesting presentation of an indication of the first user's reaction to at least some of the other user equipment devices via the communication network. The message might specify the indication, such as a visual effect, audio effect, haptic effect or combination thereof. For example, the message may include an audio or visual clip, icon, emoji, image or text for presentation to other users, or an indication of a name or location of a stored clip, icon, image or text from which the other user equipment devices may retrieve the desired effect. Alternatively, or additionally, the message may specify a context of the first user's reaction or an intention of the first user, based on the context information. The message may also include coordinates determined from the outputs of the cameras 320, 322, 324 indicating a position to be highlighted or indicated to the other users.

The message may be sent to some or all of the user equipment devices participating in the shared viewing activity. For example, the users in the group may be arranged into sub-groups. In the example shown in FIG. 3A, users 1 and 2 are in a first sub-group, which, optionally, may be indicated by the arrangement of their respective video images 308, 310 on the screen or by a visual indication such as a colored border 326 around their videos 308, 310. The sub-group may be defined by one of the users manually or based on their respective user profile information. For example, users 1 and 2 may have been placed in the same sub-group based on their user profiles indicating their support for Team B, whereas users 3 and 4 might support Team A. In such a scenario, the user equipment 300 may send the message to only those user equipment devices of the users in the same sub-group as the first user 302.

Alternatively, the user equipment device 300 may send the message to all of the other user equipment devices for presentation to all the users participating in the group watch activity. In some embodiments, the other user equipment devices may determine whether or not to present the audio clip and celebratory text based on user profile information of their respective users. For example, if user equipment 300 sends the message to the user equipment devices of users 2-4, then the user equipment device of user 2 may determine, for example based on the inclusion of user 2 in the same sub-group as user 1 or on user profile information indicating that user 2 supports Team B, that the first user's reaction should be reflected on its display of the media content, while the user equipment device of user 3 may determine that the first user's reaction should not be presented to user 3.

Figure 3B:
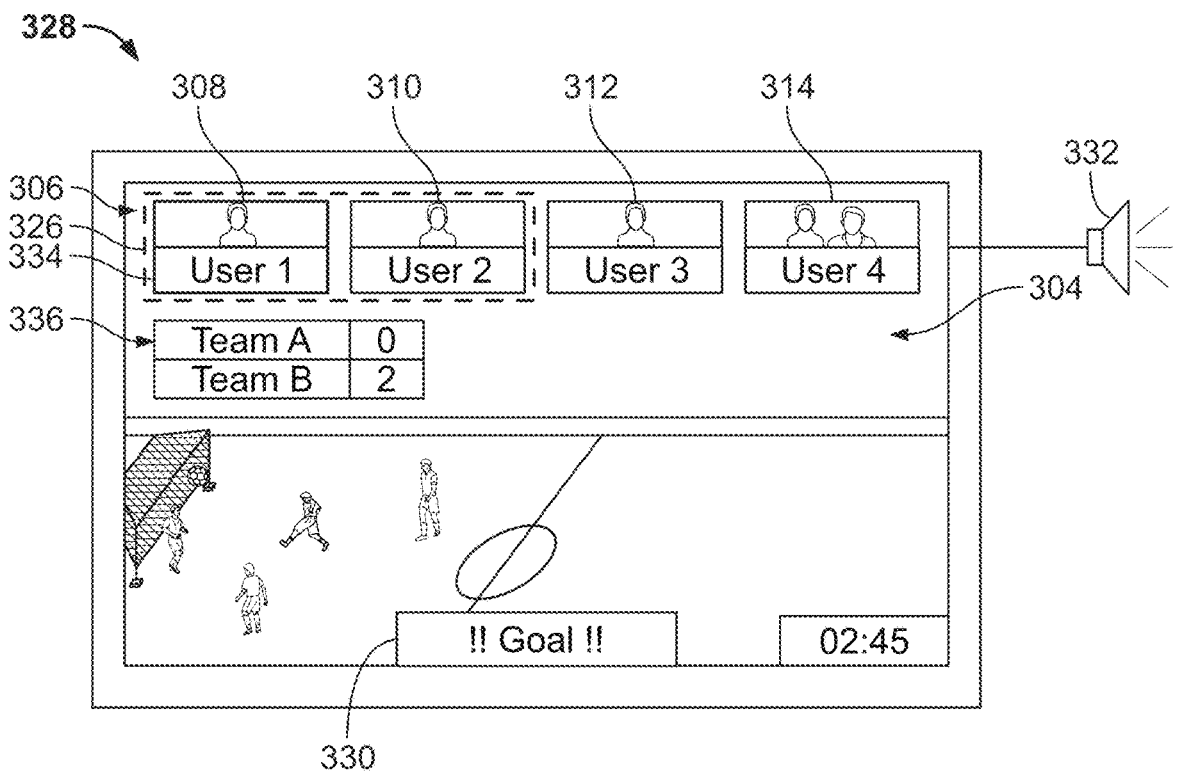

FIG. 3B depicts the presentation of the first user's reaction on the user equipment device 328 of another user in the group in response to receipt of the message from the user equipment device 300. In the example shown in FIG. 3B, a display screen of the user equipment device 328 presents the media content in a main display portion 304 and the gallery of user images 308, 310, 312, 314. The celebratory text is displayed, for example by overlaying a banner 330 on the media content.

The user equipment device 328 may determine a position within the display to present the banner 330 by determining a portion of the main display 304 that is relatively unimportant. In the example shown in FIG. 3B, the banner 330 is overlaid on a portion of the main display 304 that does not obscure the players or ball. Control circuitry of the user equipment device 328 may determine the position in which to display the banner 330 or other visual effect based on the interests of the other user. For example, the position may be determined based on user profile information indicating the other user's interest in the teams, particular players, or other objects shown in the display screen.

Optionally, an audio clip of the first user's exclamation 316 is played through a speaker 332 connected to, or integrated into, the user equipment device 328. Optionally, a second visual indicator highlighting the first user 302 is also provided, such as a border 334 around the first user's video 308.

Figure 4:
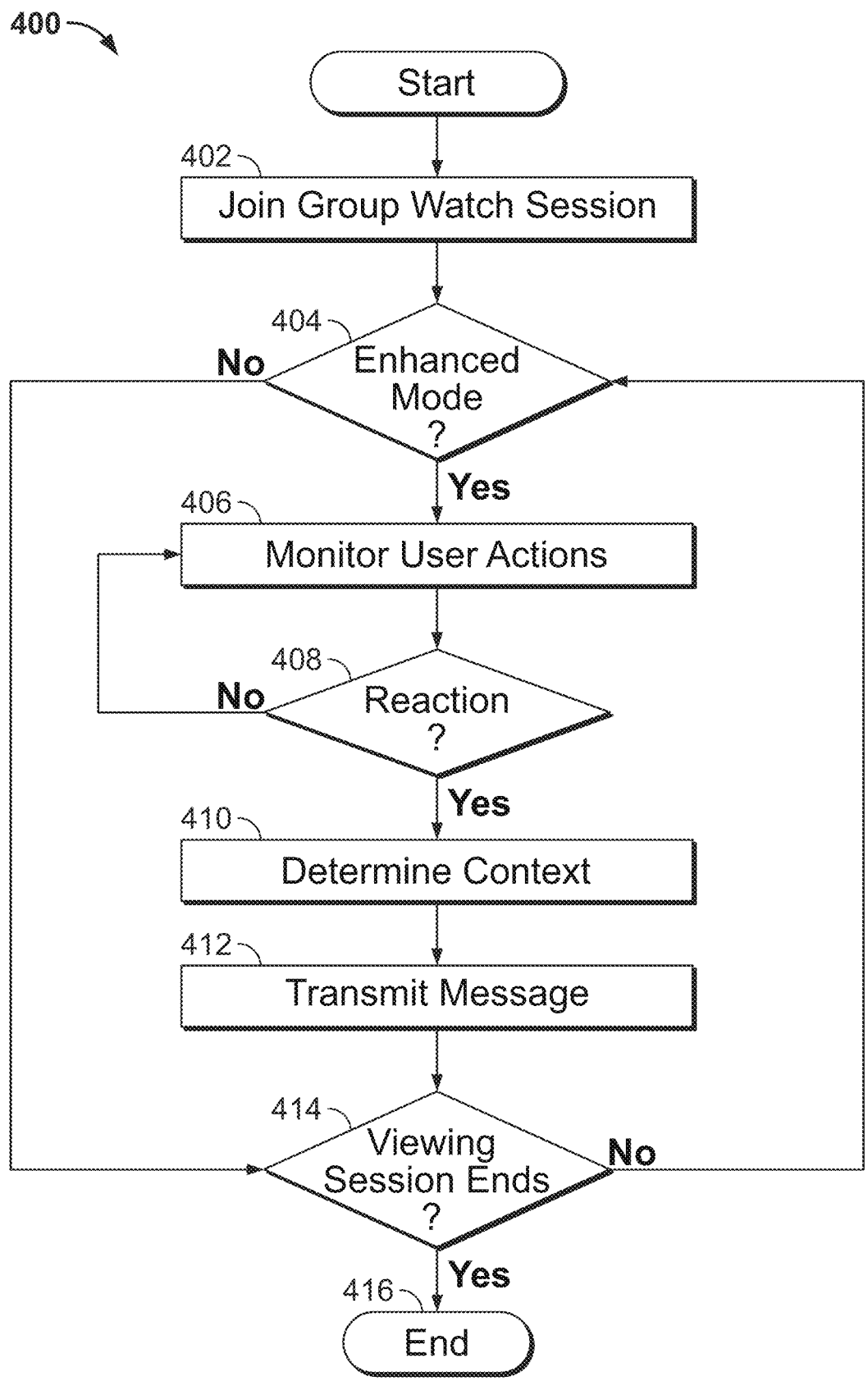
FIGS. 4 & 5 are flowcharts of procedures for detecting and outputting a user reaction as shown in FIGS. 3A & 3B respectively.
Figure 5:
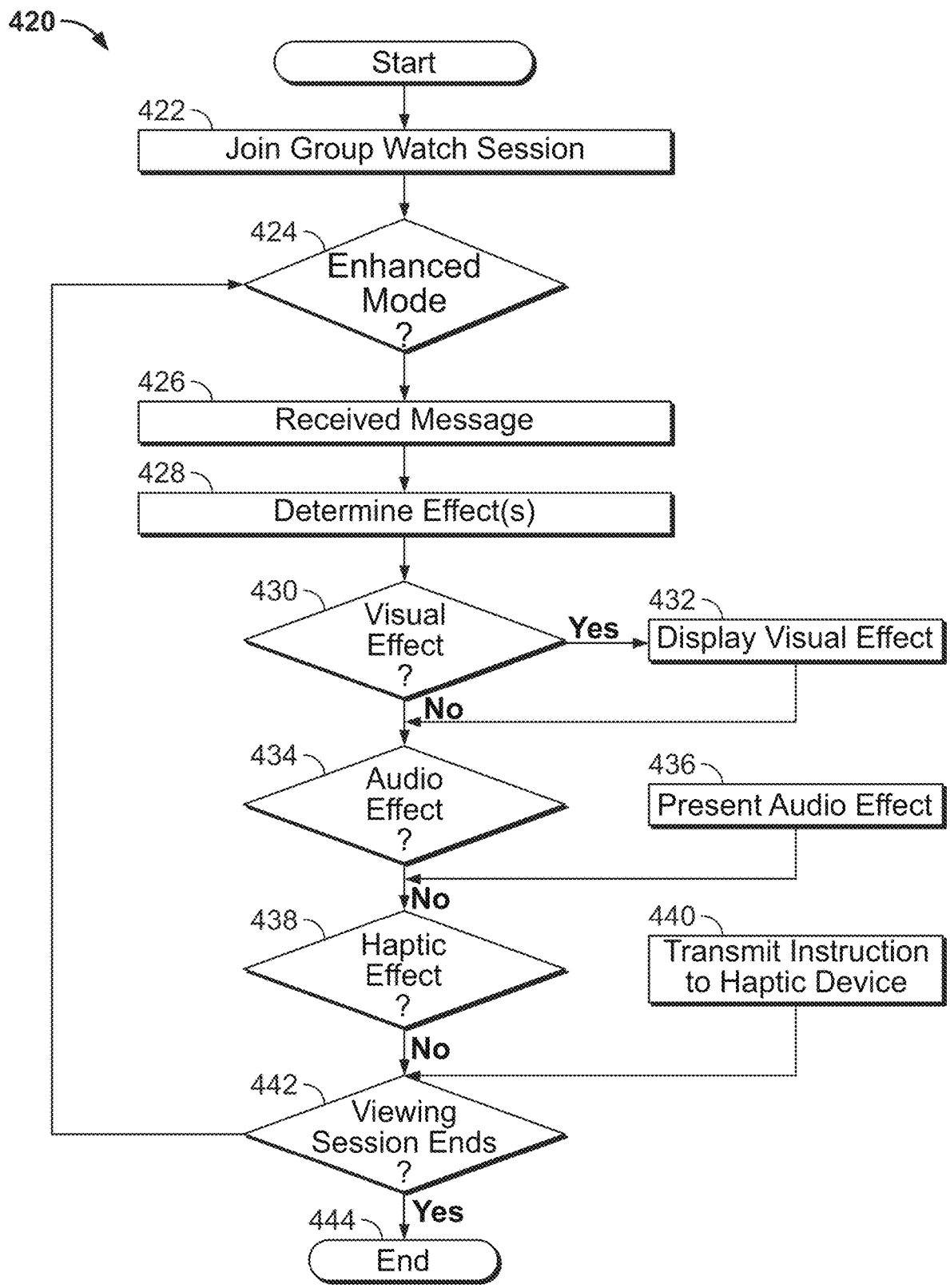

FIGS. 4 and 5 are flowcharts of processes performed by the control circuitry of the user equipment devices 300, 328 respectively, to convey the first user's reaction in the example of FIGS. 3A and 3B. Beginning at step 400 of FIG. 4, based on an instruction received from the first user 302, for example, through the user input interface or a voice command, the control circuitry of the user equipment 300 joins a group watch session (step 402). The group watch session may be initiated by the user equipment device 300 based on the instruction or, alternatively, the user equipment device 300 may join an existing group watch session initiated by another user.

The user equipment 300 then begins presenting the media content. In this example, four user equipment devices 300, 328 are presenting a soccer match to users 1-4 in a group watch session, as shown in FIG. 3A, and more than one user may be viewing the content at any one of the user equipment devices. Video of the first user 302 may then be captured through the one or more cameras 320, 322, 324 and transmitted to the other user equipment devices connected to the group viewing session for display in the gallery 306 portion of their respective display screens. Optionally, audio of the first user 302 may be captured through the microphone 318 and transmitted to the other user equipment devices instead of, or as well as, the video of the first user 302 to allow the users to converse with one another. The users may be divided into sub-groups and messages, reactions or chat may optionally be directed only to members of a particular sub-group.

The group watch application may include a setting that allows the first user 302 to activate an enhanced interaction mode, in which the first user's reactions are monitored and conveyed to one or more other users in the group viewing session. Alternatively, such a setting may be associated with the group viewing session, rather than set by individual users, or may be a default mode of the group watch application. If an enhanced interaction mode is activated (step 404), then the captured video and/or audio is monitored to detect gestures or sounds, and/or other actions from the first user 302 indicative of a reaction to the media content (step 406). For example, the control circuitry may perform a gesture recognition on captured video of the user 302 to detect physical gestures such as facial expressions, waving, pointing, a "high-five," raising a hand, or other movements of the first user 302. For example, the control circuitry may determine one or more reaction characteristics, such as a direction, a magnitude, and a type of a movement. Such characteristics may be determined based on the video captured by the one or more cameras 320, 322, 324 and, where multiple cameras 320, 322, 324 are provided, comparing the captured videos, and/or from analysis of data received from a device 325 worn by the user 302 or held by the user 302 indicative of the first user's movements, such as a smartwatch or cellphone including an accelerometer or gyroscope. The control circuitry may then access a database that lists movement characteristics and types of movement characteristics together with corresponding reactions. Alternatively, or additionally, the control circuitry may parse audio input received via the microphone 318 to identify verbal cues, sounds or keywords in the first user's speech indicative of a reaction to determine one or more reaction characteristics, and those characteristics to corresponding reactions.

The control circuitry determines, based on the analysis of the captured video and/or audio, whether a reaction from the first user 302 is detected (step 408). If no reaction is detected, then the process returns to monitoring the user at step 406. If a reaction is detected, then the control circuitry determines a context of the reaction (step 410). The context may be determined based on the media content. For example, the control circuitry may determine a context based on metadata accompanying the media content, or on recognition of objects or audio cues in the media content. In FIG. 3A, where the media content is a soccer match, the context may be determined based on detection of cheering, the word "goal" appearing in oral commentary in an audio component of the media content, in text of a ticker included in the media content, or in closed caption data accompanying the media content. The control circuitry may thus determine that the first user is reacting to a goal in the soccer match. Alternatively, or additionally, the control circuitry may detect a keyword "goal" in a verbal cue extracted from the captured audio or a cheer from the first user and determine the context to be a goal or based on recognition of a change in the score shown on a scoreboard 336 in the media content. Another option that may be combined with the use of the captured audio and/or video is to use the user profile information in the context determination. For instance, the control circuitry may determine that the first user 302 supports Team B, based on one or more of a viewing history of soccer matches involving Team B, an indication in a user profile, such as a media guidance user profile or a social media profile of the first user 302, previous social media posts by the first user 302 and/or the first user 302 belonging to a group of Team B supporters in a social network. For example, the control circuitry may determine that a goal has been scored based on the media content or accompanying data and determine, based on the profile information of the first user 302, that the goal was scored by Team B, resulting in a context of a Team B goal.

At step 412, the control circuitry transmits a message to at least one other user equipment device 328 participating in the shared viewing session. The message may indicate an intent of the first user 302, such as celebrating, and a context, such as a goal for Team B, from which the other user equipment device can determine a corresponding action to perform to convey the first user's reaction to another user. Alternatively, the control circuitry may determine an action to be performed by the other user equipment devices to convey the first user's reaction, such as the display of the banner 330, a celebration emoji, playing an audio clip of cheering, etc., and indicate that action in the message, for example by correlating the reaction and context with entries in a database listing corresponding actions and/or effects. In some embodiments, the message may optionally identify a file or location of a file containing audio or video data for display or may include the file itself. The message may be, or include, a JavaScript Object Notation (JSON) format file.

The control circuitry then continues operating in the enhanced mode (step 404) and returns to monitoring the first user's actions at step 406 until either the enhanced mode is deactivated (step 404) or the viewing session finishes (step 414), ending the process (step 416).

FIG. 5 depicts a process performed by the second user equipment device 328. Beginning at step 420, the second user equipment device 328 joins the group viewing session (step 422). If the enhanced mode is activated (step 424) then, when the message from the user equipment 300 is received (step 426), the control circuitry of the second user equipment 328 determines one or more effects to be presented, based on the message (step 428). As noted above, the message may specify a particular effect determined by the user equipment device 300. Alternatively, the control circuitry of the second user equipment device 328 may determine the one or more effects to be presented based on the information contained in the message, for example by mapping information about the reaction and context to database entries matching such information to particular actions and/or effects.

The control circuitry of the second user equipment device 328 then performs actions based on the message by presenting the determined effects. If the one or more determined effects include a visual effect (step 430) then the effect is displayed (step 432), such as the display of the banner 330, a video clip, an icon, a meme, or emoji. If the one or more determined effects include an audio effect (step 434) then the effect is output (step 436), for example by playing an audio clip, part of the captured audio from the first user 302 or a sound effect. If the one or more determined effects include a haptic effect (step 438), then an instruction to provide a haptic effect is transmitted to a haptic device in communication with the second user equipment 328 (step 400). For example, the second user equipment may transmit instructions to a smartwatch of the user to cause it to vibrate.

The example method shown in FIG. 5 includes decisions 430, 434, 438 whether to provide visual, audio and haptic effects and steps 432, 436, 440 that may be performed to provide such effects. In other embodiments, however, the steps relating to one or more of these effects may be omitted. For example, a method according to another embodiment may include the steps 430, 432, 434, 436 relating to providing a visual effect and/or audio effect, but omit the steps 438, 440 relating to a haptic effect. A method according to yet another embodiment might include only the steps 430, 432 relating to a visual effect and omit the steps 434, 436, 438, 440 relating to audio and haptic effects, and so on.

The control circuitry of the second user equipment device then continues with the group viewing session, awaiting further messages and optionally monitoring actions of the second user in a similar manner to the monitoring in step 406 of FIG. 4A, until either the enhanced mode is deactivated (step 424) or the viewing session finishes (step 442), ending the process (step 444).

Although the processes of FIGS. 4 and 5 have been described with reference to a particular group watch session, it will be understood that these methods may be implemented in group watching of live content or group watching of on-demand content, or in other shared viewing experiences such as a videocall, a videoconference, a multi-player game, or when screen-sharing. In addition, the examples of visual, audio and haptics effects are not limiting. In other embodiments, different effects may be presented instead of, or as well as, the effects described above.

Figure 6A:
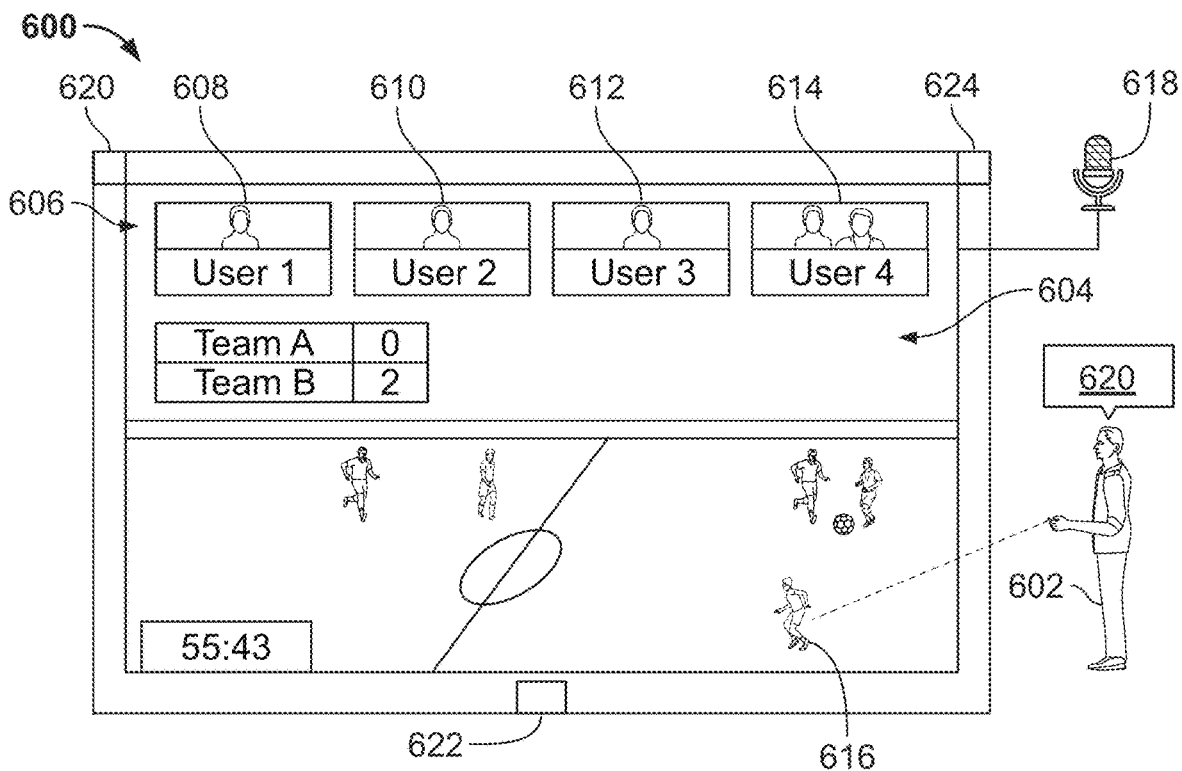
FIGS. 6A & 6B depict an example of a display of media content enhanced with a user reaction directed at a portion of the displayed content.

FIG. 6A depicts another example of a user reaction and corresponding effect, in which a visual effect is used to enhance a verbal cue from a first user. A display screen, shown on a user equipment device 600 of the first user 602 in a group viewing session, presents media content in a main display portion 604. Also presented is a gallery 606 of images 608, 610, 612, 614 showing video or avatars of other users in the group viewing session. In the example shown in FIG. 6A, the media content is a soccer match and the first user 602 is commenting that the ball should be passed to a particular player 616. The comment by the first user 602 is detected by a microphone 618 that is connected to, or integrated into, the user equipment 600. In some embodiments, if the first user 602 has mentioned the player's name, nickname, position or squad number in his comment 620, then the context of the first user's comment 620 could be determined by extracting that information as a keyword from the audio detected by the microphone 618. In this particular example, however, the comment 620 from the first user 602 does not identify the player 616, and so the context of the comment cannot be determined from the comment alone.

The user equipment device 600 includes, or is in communication with, two or more cameras 620, 622, 624. One of these cameras may be used to obtain the video 608 of the first user 602 shown in the gallery 606, in addition to providing video for monitoring the first user's actions. The video of the first user 602 captured by the two or more cameras 620, 622, 624 is analyzed to detect certain gestures, such as facial expressions, physical gestures and movements. In this example, the control circuitry uses gesture recognition to determine that the first user 602 is pointing towards the display screen.

The control circuitry of the user equipment 600 then compares the images captured by the cameras 620, 622, 624 to determine a portion of the display screen to which the first user 602 is pointing. For example, the control circuitry may determine coordinates of the portion based on orientations of the first user's finger as shown in the multiple images.

The control circuitry of the user equipment 600 then generates a message for transmission to a second user equipment 626 participating in the shared viewing session. The message includes the context, i.e., co-ordinates or other information identifying the portion of the display screen. The message may optionally include the first user's comment as an audio clip. Alternatively, the user's comment may already have been conveyed to the users as part of the shared viewing activity, and need not be included with the message. In some embodiments, the message may specify a particular action to be performed by the other user equipment device 626, such as visually highlighting the portion or player 616, in a similar manner to that described above in relation to FIG. 4. In other embodiments, the second user equipment 626 may determine the action to be performed based on the information in the message, as described above in relation to FIG. 5.

Figure 6B:
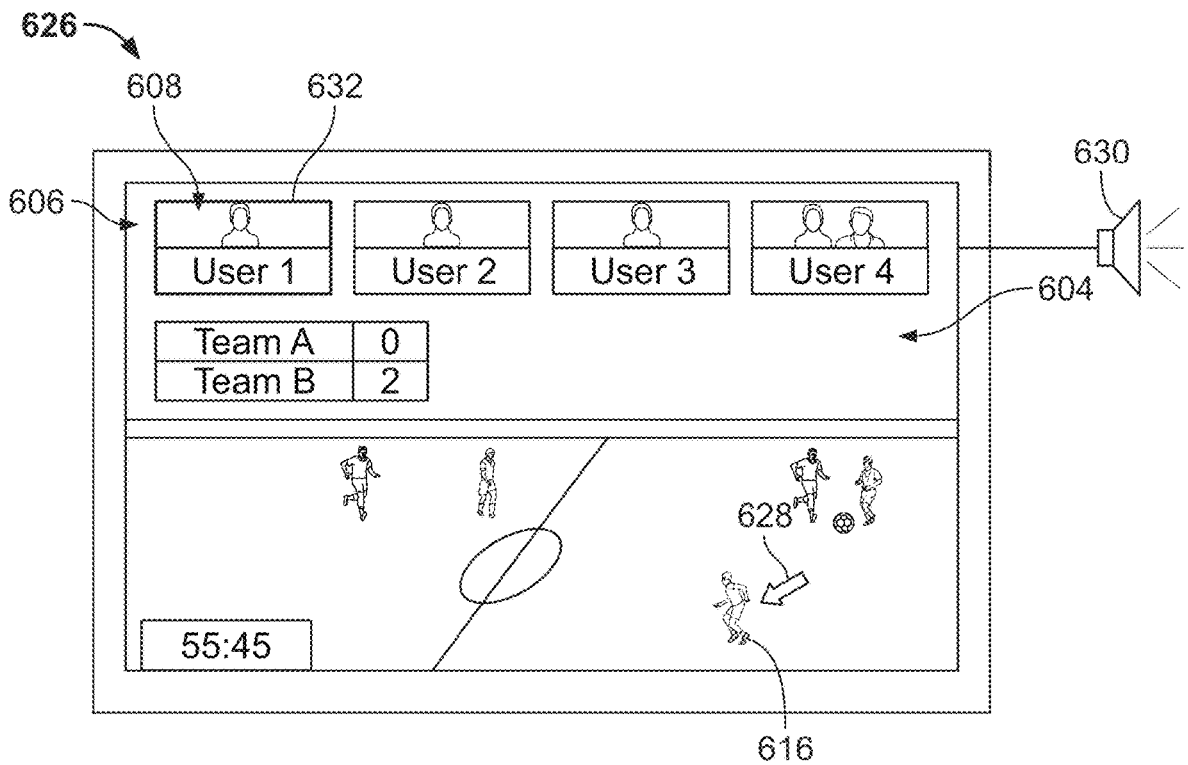

FIG. 6B depicts the presentation of the first user's reaction on the second user equipment device 626. A display screen of the second user equipment device 626 presents the media content in a main display portion 604 and the gallery 606 of user images 608, 610, 612, 614. A first visual effect 628 is provided indicating the player identified by the first user 602 to supplement the audio of the first user's comment played through a speaker 630 connected to, or integrated into, the second user equipment device 626. Optionally, a second visual indicator 632 highlighting the first user 602 is also provided. In this particular example, the first visual effect 628 is an arrow pointing at the portion of the display screen in which the player 616 is located and the second visual indicator 632 is a border around the image 608 of the first user 602.

Figure 7:
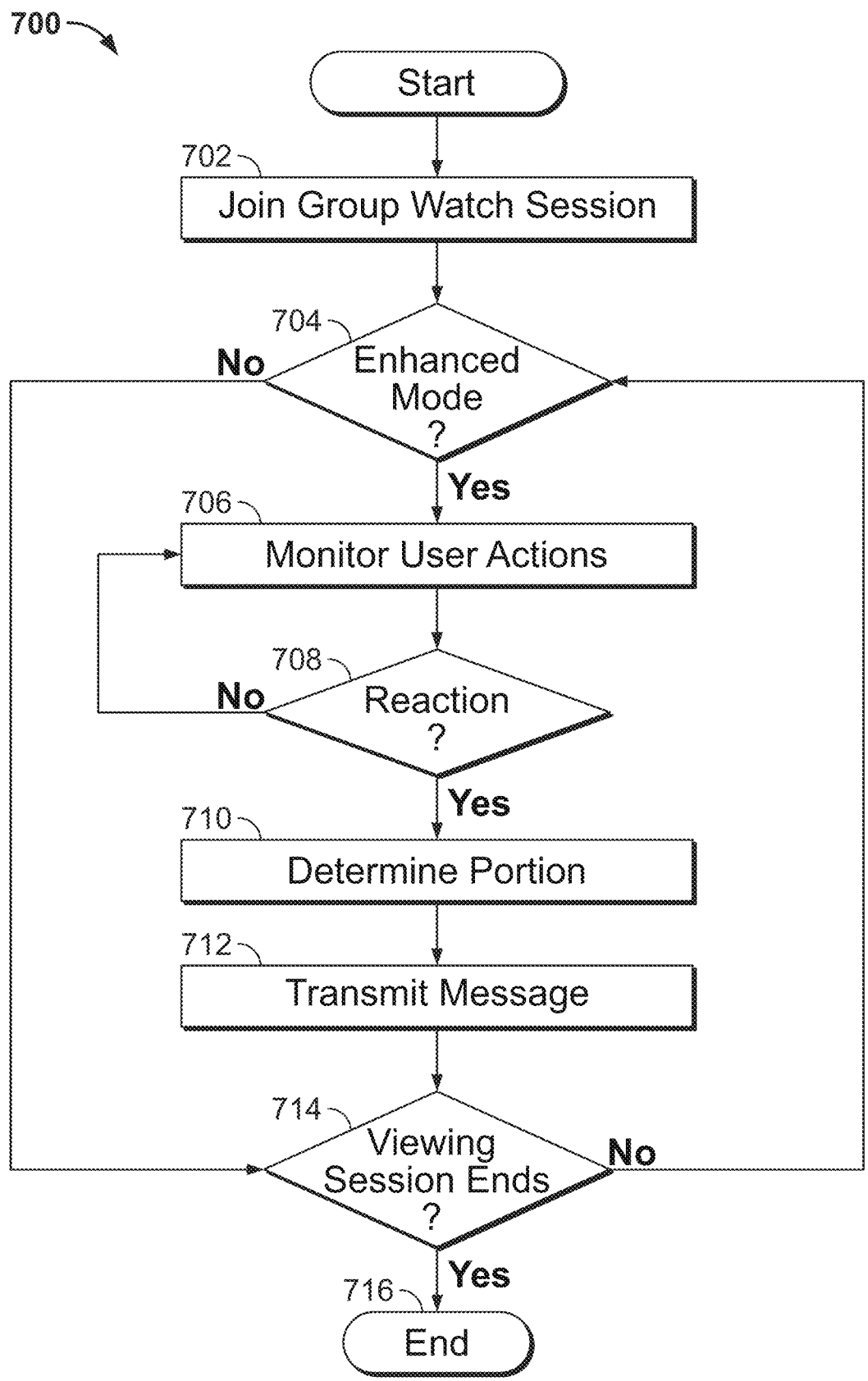
FIG. 7 is a flowchart of a procedure for detecting and responding to a user reaction as shown in FIG. 6A.

FIG. 7 is a flowchart of a process performed by the control circuitry of the first user equipment device 600 to detect the first user's reaction and transmit a message based on that reaction to the second user equipment device 626. Beginning at step 700 of FIG. 7, the control circuitry of the user equipment 600 joins a group watch session (step 702), in a similar manner to that described above in relation to FIG. 4A, and begins presenting the media content. Video of the first user 602 is captured through one of multiple cameras 620, 622, 624 and transmitted to other user equipment devices connected to the group viewing session for display in the gallery 606 on their respective display screens. Audio of the first user 602 is captured through the microphone 618 and transmitted to the other user equipment devices instead of, or as well as, the video of the first user 602, to allow the users to converse with one another. The users may be divided into sub-groups and messages, reaction or chat may optionally be directed only to members of a particular sub-group.

If an enhanced interaction mode is activated (step 704), then the captured video and audio is monitored to detect gestures and verbal cues from the first user 602 indicative of a reaction to the media content (step 706). The control circuitry performs a gesture recognition on captured video of the user 602 to detect physical gestures made by the first user 602. In addition, the control circuitry parses audio input received via the microphone 618 to identify verbal cues or keywords in the first user's speech indicative of a reaction.

The control circuitry determines, based on the analysis of the captured video and/or audio, whether a reaction from the first user 602 is detected (step 708). If no reaction is detected, then the process returns to monitoring the user at step 706. If a reaction is detected, then the control circuitry may determine a portion of the screen to which the first user 602 is pointing (step 710), for use in determining a context of the reaction. In the example shown in FIG. 6A, the subject of the first user's comment is not identified in the audio input and so the context includes the identity of the player 616 and/or the portion of the display screen that includes that player 616. In this example, the context is determined based on captured video. The control circuitry of the user equipment device 600 compares the images from the multiple cameras 620, 622, 626 and determines a portion of the display screen to which the first user 602 is pointing. For example, the control circuitry may determine from an orientation and size of the first user's finger in the captured video coordinates of a portion of the display screen to which the first user 602 is pointing. The control circuitry of the user equipment device may be configured to obtain additional information, such as information about the players currently shown on screen, by performing an object recognition process and/or based on metadata of the media content or by extracting keywords in audio cues, text in a ticker included in the media content or closed caption data of the media content.

At step 712, the control circuitry transmits a message to at least one other user equipment device 626 participating in the shared viewing session. The message indicates, at least, context information that identifies the portion of the display screen that the first user 602 is pointing towards. The message may specify a visual effect 628 to indication the portion, such as highlighting the corresponding portion of a display screen viewed by another user in the group viewing session, for example by overlaying an arrow, as shown in FIG. 6B, or placing a colored border around the portion. Alternatively, the control circuitry of the second user equipment device 626 may determine the visual effect 628 to be displayed and display that effect based on the information in the message that identifies the portion. The message may provide the context information in a JavaScript Object Notation (JSON) format file.

The control circuitry then returns to monitoring the first user's actions at step 706 until either the enhanced mode is deactivated (step 704) or the viewing session finishes (step 714), ending the process (step 716).

The process described above in relation to FIG. 7 may be performed by the second user equipment device 626 to receive the message and provide a visual effect to indicate the corresponding portion of the display screen.

Figure 8A:
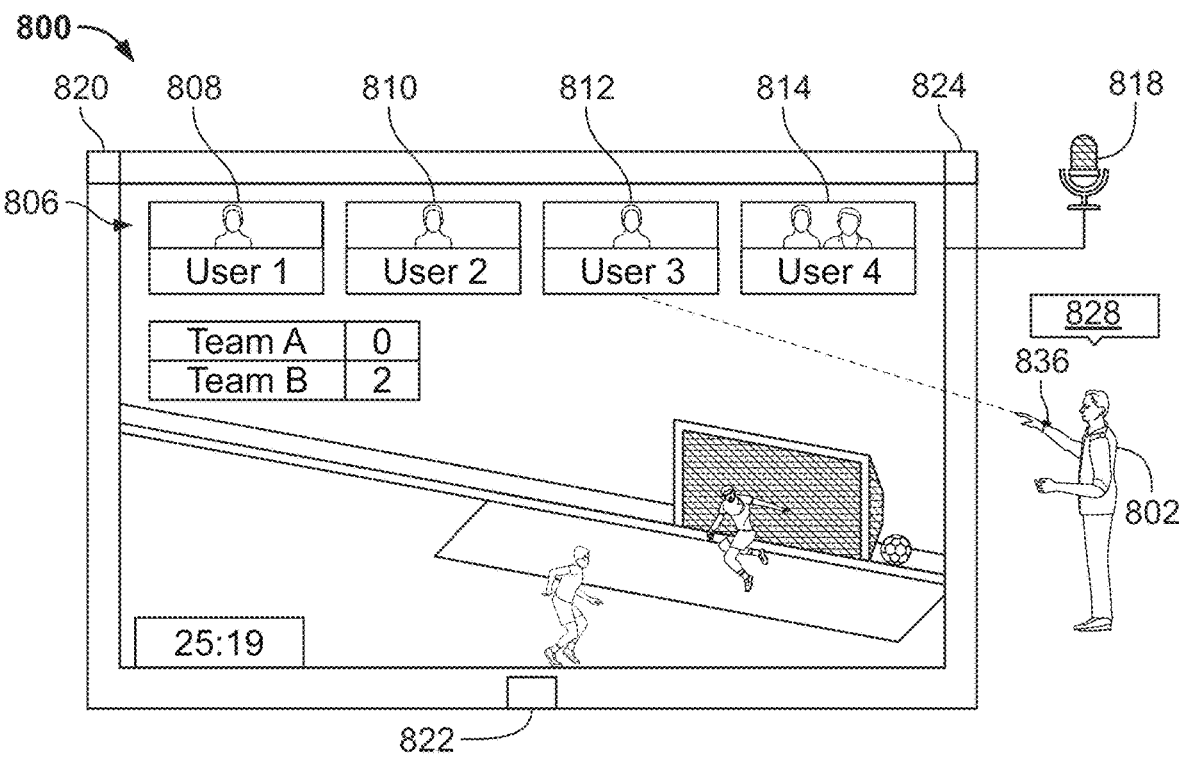
FIGS. 8A & 8B depict an example of a display of media content enhanced with a user reaction directed at a particular user.
Figure 8B:
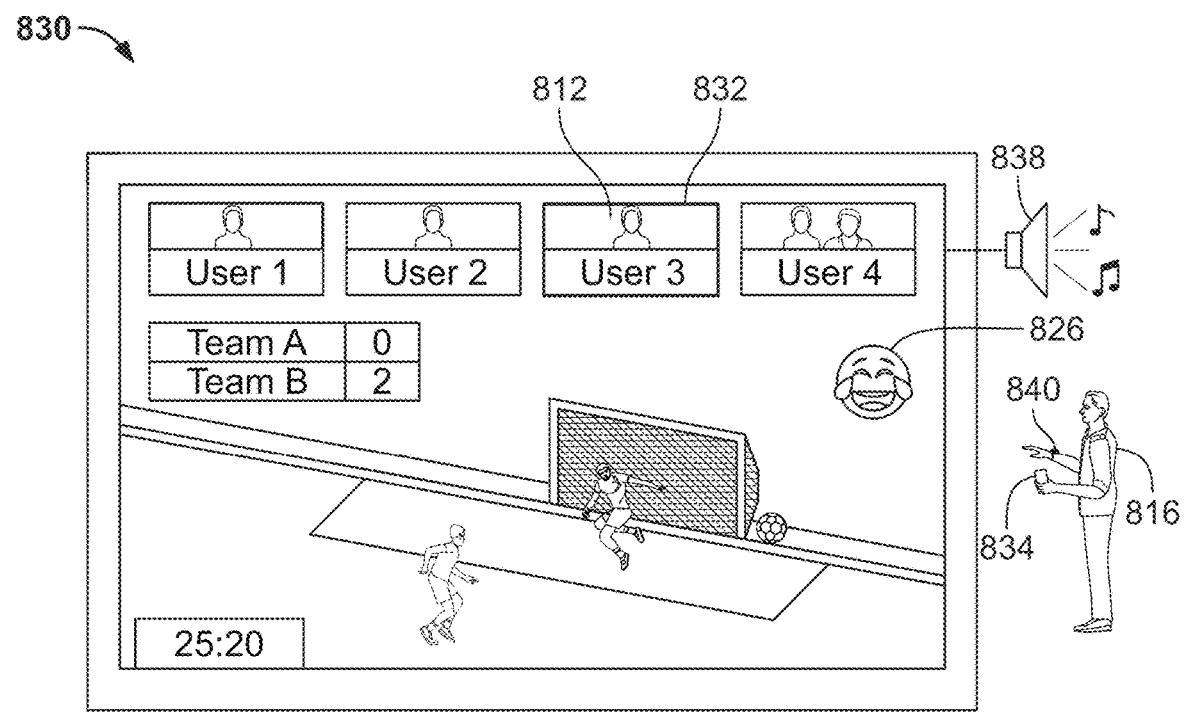

FIGS. 8A and 8B depict another example of a display of media content enhanced with a user reaction directed at a particular user in a shared viewing session. A display screen, shown on a user equipment device 800 of the first user 802 in a group viewing session, presents media content in a main display portion 804 together with a gallery 806 of images 808, 810, 812, 814 showing video or avatars of other users in the group viewing session. In the example shown in FIG. 8A, the media content is a soccer match, and the first user 802 is making a comment 828 directed at the other user corresponding to image 812. The context to be determined in this case includes the identity of the other user to which the comment is directed.

In this example, the comment by the first user 802 is detected by a microphone 818 that is connected to, or integrated into, the user equipment 800. In other examples, the first user 802 may, instead, direct a physical gesture such as a high-five, at the other user. If the user has mentioned the others user's name or nickname, then the other user may be determined by extracting that information as a keyword from the audio detected by the microphone 818. In this particular example, however, the comment from the first user 802 does not identify the other user 816, and so they cannot be determined from the comment alone.

The user equipment device 800 includes, or is in communication with, two or more cameras 820, 822, 824. One of these cameras may be used to obtain the video 808 of the first user 802 shown in the gallery of images 808, 810, 812, 814, in addition to providing video for monitoring the first user's actions. The video of the first user 802 captured by the two or more of the cameras 820, 822, 824 is analyzed to detect certain gestures, such as facial expressions, physical gestures and movements. In this example, the control circuitry uses gesture recognition to determine that the first user 802 is pointing at the display screen.

The control circuitry of the user equipment 500 then compares the images captured by the cameras 820, 822, 824 to determine a portion of the display screen to which the first user 802 is pointing. For example, the control circuitry may determine coordinates of the portion based on orientations and sizes of the first user's finger shown in the multiple images.

The control circuitry of the user equipment 800 may then determine, based on such coordinates, that the first user 802 is pointing at the third image 812 in displayed gallery 806 of user images 808, 810, 812, 814. The control circuitry of the user equipment 800 may, based on this determination, direct the first user's reaction to the other user, for example by generating and transmitting a message only to the user equipment of the other user, generating and transmitting a message only to members of a sub-group to which the other user belongs, or by transmitting a message to the other user equipment devices having context information that indicates that the reaction is directed to that other user. If the first user's gesture was accompanied by other input, such as audio input received via the microphone 818, then the message generated by the control circuitry of the user equipment device 800 may specify an action based on that input or may include the context of the other input.

As described above in relation to FIG. 3A, the first user 802 may be wearing or holding a device, such as a smartwatch 836, that includes an accelerometer or gyroscope that provides data indicative of the first user's movements. Such data may allow a more precise determination of the first user's gesture. For example, in FIG. 8A, the first user 802, may be trying to get user 3's attention by making a "poking" motion. The data from the smartwatch 836 may allow the user equipment 800 to distinguish between such a "poking" motion and a movement in which the first user 802 is simply pointing at the image 812 of user 3.

The user equipment devices may receive the message and determine, based on the context information regarding the other user, whether or not to perform an action based on the message. For example, even if a reaction is directed to another user, a user equipment device receiving the message might still perform an action to convey the first user's reaction and display a visual effect 832 highlighting the image 812 in the gallery corresponding to the user to whom the reaction is directed. Alternatively, if the reaction is a "poke" action directed to user 3, the user equipment devices of users 2 and 4 may determine that no action is to be performed based on the received message.

The message may include context that is further based on the media content. For example, the control circuitry of the user equipment device 800 may determine that Team A has just missed a penalty kick in the soccer match and may have determined, from the first user's user profile information, that the first user 802 supports Team B. The control circuitry of the user equipment device 800 may further determine, based on attributes of the shared viewing session, that the other user supports Team A, for example, based on the first user 802 and other user belonging to different sub-groups. In such an example, the control circuitry of the user equipment device 800 may determine that the first user's reaction is mocking the other user's team, and may include an action to provide a mocking visual effect, such as a "crying/laughing" emoji 826; a mocking audio effect, such as an audio clip of sad violin music to be played through a speaker 838 of the user equipment device 830 of the other user; or a video filter to adapt the displayed image 812 of the other user. Alternatively, the message generated by the control circuitry of the user equipment device 800 may include an indication in that the reaction mocks the other user's team, and the control circuitry of the user equipment device 830 of the other user may determine a visual and/or audio effect to present to the other user based on that context.

This example may additionally, or alternatively, include a haptic effect. In response to determining that the first user 802 is pointing at the other user, the control circuitry of the user equipment device 800 may include, in the message, an indication that a haptic effect is to be output, for example to get the other user's attention. In another example, the control circuitry of the user equipment device of the other user may determine that a haptic effect should be output, based on the message including context indicating that the reaction is directed to the other user.

Such a haptic effect may be provided by the control circuitry of the user equipment device 830 transmitting an instruction to another device of the other user. For example, the other device may be a smartwatch 840 worn by the other user and the instruction may cause the smartwatch 840 to vibrate. In another example, the other device may be a cellphone 834 of the other user and the instruction may cause the cellphone 834 to vibrate. If the user equipment device 830 of the other user includes a haptic output device, for example, a touch-screen device, such as a tablet, arranged to provide haptic feedback, then the user equipment device 830 may generate the haptic effect itself.

Figure 9:
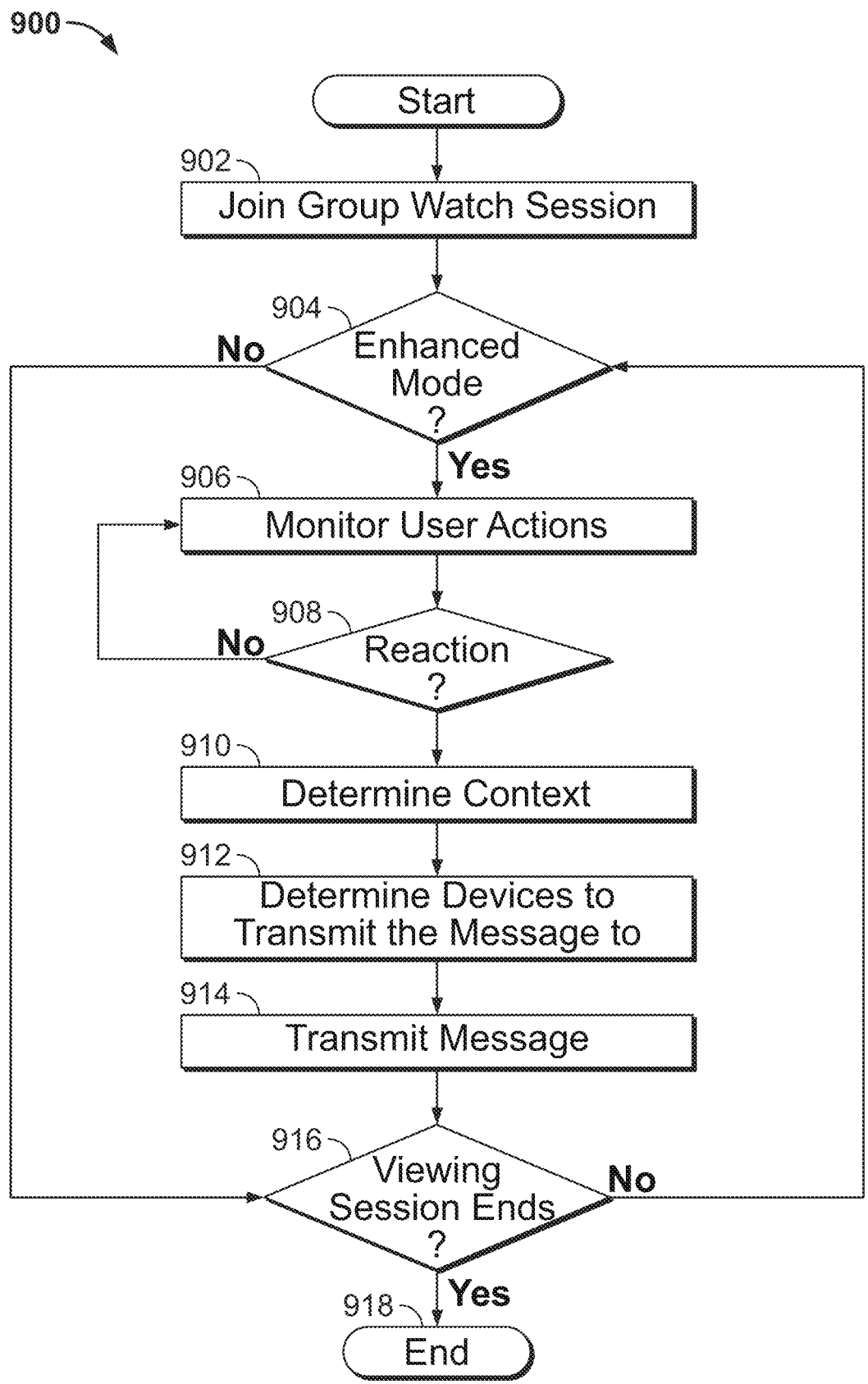
FIG. 9 is a flowchart of a procedure for detecting a user reaction as shown in FIG. 8A.

FIG. 9 is a flowchart of a process performed by the control circuitry of the first user equipment device 800 to detect the first user's reaction and transmit a message based on that reaction to the second user equipment device 830. Beginning at step 900 of FIG. 9, the control circuitry of the user equipment 800 joins a group watch session (step 902), in a similar manner to that described above in relation to FIG. 4A, and begins presenting the media content. Video of the first user 802 is captured through one of multiple cameras 820, 822, 824 and transmitted to other user equipment devices connected to the group viewing session for display in the gallery 806 portion of their respective display screens. Audio of the first user 802 is captured through the microphone 818 and transmitted to the other user equipment devices instead of, or as well as, the video of the first user 802, to allow the users to converse with one another. The users may be divided into sub-groups, and messages, reaction or chat may optionally be directed only to members of a particular sub-group.

If an enhanced interaction mode is activated (step 904), then the captured video and audio are monitored to detect gestures and verbal cues from the first user 802 indicative of a reaction to the media content (step 906). The control circuitry performs a gesture recognition process on captured video of the user 802 to detect physical gestures made by the first user 802. In addition, the control circuitry parses audio input received via the microphone 818 to identify verbal cues or keywords in the first user's speech indicative of a reaction.

The control circuitry determines, based on the analysis of the captured video and/or audio, whether a reaction from the first user 802 is detected (step 908). If no reaction is detected, then the process returns to monitoring the user at step 806. If a reaction is detected, then the control circuitry determines a context of the reaction (step 910). In the example shown in FIG. 8A, the other user to whom the first user's reaction is directed is not identified in the audio input, and so the context includes the identity of that other user to whom the first user 802 is gesturing and/or a portion of the display screen that includes the image 812 corresponding to the other user. The context is determined based on captured video. The control circuitry of the user equipment device 800 compares the images from the multiple cameras 820, 822, 824 and determines a portion of the display screen to which the first user 802 is pointing. For example, the control circuitry may determine, from an orientation and size of the first user's finger in the captured video, coordinates of a portion of the display screen to which the first user 802 is pointing. The context may also include other information based on the media content, such as a recent missed penalty kick by Team A and/or an indication of the intent behind the first user's reaction. For example, based on user profile information of the first user 802 indicating that they support Team B, the control circuitry of the user equipment device 800 may determine that the first user's reaction is mocking the team supported by the other user, Team A, and include an indication of the first user's mocking intent in the determined context.

Optionally, at step 912, the control circuitry of the user equipment device 800 may determine which of the other user equipment devices should receive the message. For example, the control circuitry of the user equipment device 800 may determine that the message should be sent only to the other user, for example, if the first user's reaction correlates to nudging or poking the other user to get their attention. Alternatively, the control circuitry of the user equipment device 800 may determine that the message should be sent to all users in the same sub-group as the other user, or to all of the users in the shared viewing session. Alternatively, the control circuitry of the user equipment device 800 may send the message to all of the user equipment devices participating in the shared viewing session and the receiving user equipment devices may determine, based on the context information, whether to perform an action based on that message.

At step 914, the control circuitry of the user equipment device 800 transmits a message to at least one other user equipment device 830 participating in the shared viewing session. The message indicates, at least, the context information that identifies the other user or a portion of the display screen in which the other user's image 812 is shown. The message may specify one or more effects to be presented to the other user, such as a visual effect to indicate the portion, such as highlighting the corresponding portion of a display screen viewed by another user in the group viewing session, for example by overlaying an arrow pointing at the other user, or by placing a colored border around the portion, or activating a video filter for adapting the image 812 of the other user, an audio and/or visual effect to convey the first user's reaction, such as an emoji to display to the other user, an audio clip or effect to play to the user and/or a haptic effect. Alternatively, the control circuitry of the second user equipment device 830 may determine the one or more effects to be presented based on the context information in the message. The message may provide the context information in a JavaScript Object Notation (JSON) format file.

The control circuitry then returns to monitoring the first user's actions at step 906 until either the enhanced mode is deactivated (step 904) or the viewing session finishes (step 914), ending the process (step 916).

The process described above in relation to FIG. 5 may be performed by the second user equipment device 830 to receive the message and provide the one or more effects based on that message.

Figure 10A:
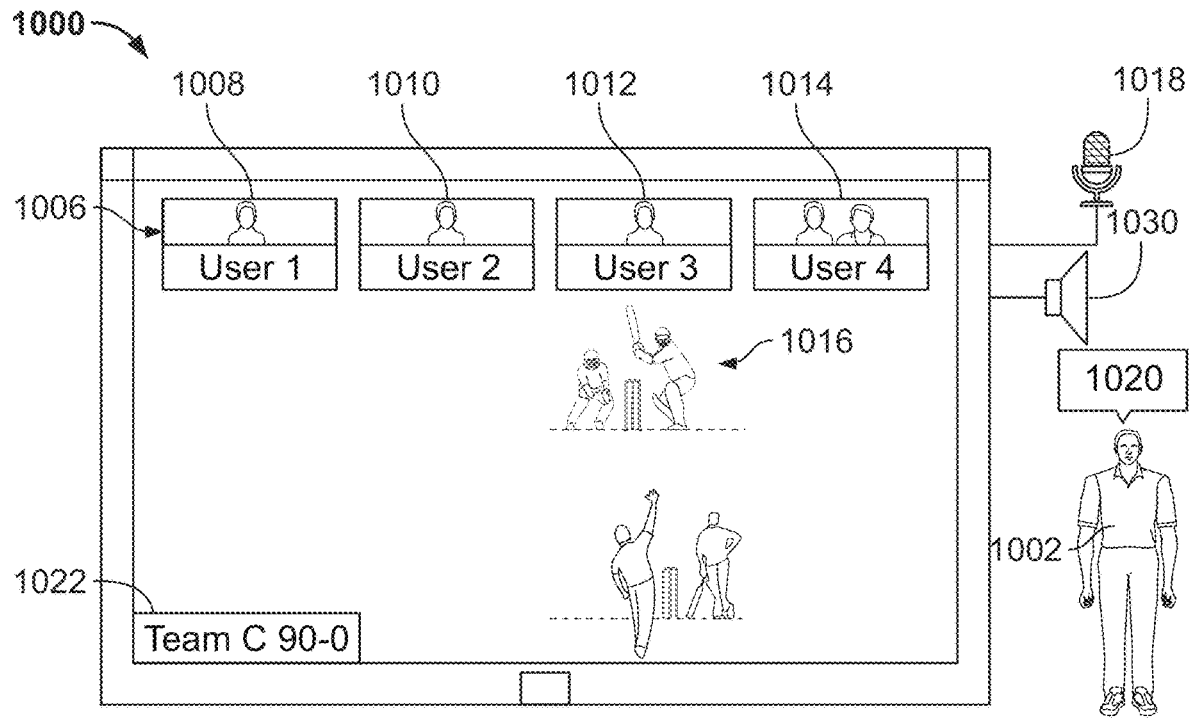
FIGS. 10A, 10B & 10C depict an example of a display of media content enhanced with a competition function between two users.
Figure 10B:
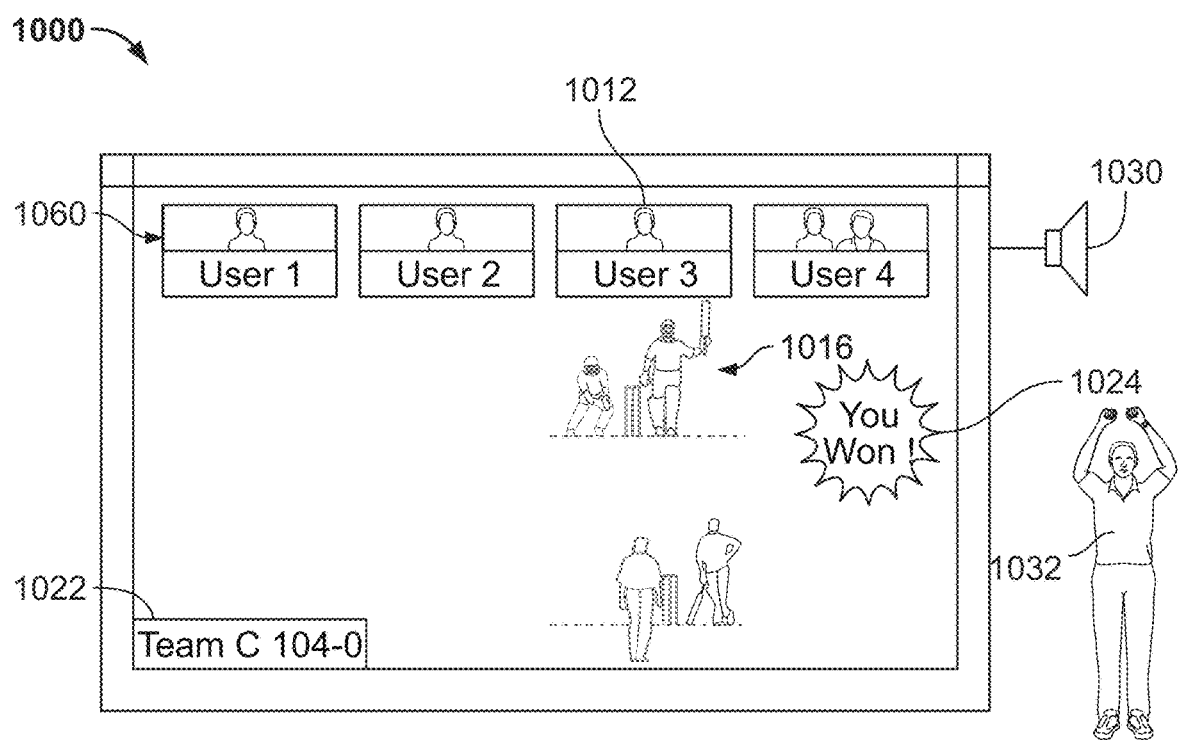

FIGS. 10A and 10B depict an example of a display of media content enhanced with a competition function, based on monitored actions of a first user 1002. A display screen, shown on a user equipment device 1000 of the first user 1002 in a group viewing session, presents media content in a main display portion together with a gallery 1006 of images 1008, 1010, 1112, 1114 showing video or avatars of other users in the group viewing session. In the example shown in FIG. 10A, the media content is a cricket match and the first user 1002 is making a comment 1020 relating to a possible future event in the cricket match. The comment 1020 is detected by a microphone 1018 that is connected to, or integrated with, the user equipment device 1000.

Audio output from the microphone 1018 is processed and parsed by the control circuitry of the user equipment device 1000 to detect keywords, in a similar manner to the embodiments described above. In this particular case, the control circuitry of the user equipment device 1000 determines that the first user 1002 has made a comment 1020 predicting the outcome of an event in the cricket match.

The control circuitry of the user equipment device 1000 may determine that the outcome is one that can be verified by monitoring the media content. In this particular example, the first user's comment 1020 provides an opinion that player 1016 will score a century in the cricket match, and the control circuitry monitors one or more of the scoreboard 1022, audio commentary, ticker text or closed caption data to determine whether the player 1016 achieves that score. Using techniques similar to those described in relation to FIGS. 6A, 6B and 7, the player 1016 may be identified based on a name or nickname included in the comment 1020 or from identifying a portion of the display screen that the first user is gesturing towards.

The user's comment 1020 may be relayed to other users in the shared viewing session, and those users may choose to disagree or agree with the first user 1002. The user equipment devices of those users may then detect respective comments from those users regarding the outcome of the event and monitor the media content to determine whether the outcome is consistent with their opinions. This allows the first user 1002 to compete with other users in the viewing sessions, for example, by making bets relating to the media content. Alternatively, the first user 1002 may set up such a competition with another user, identifying the user by name or by pointing at their image 1012 in the gallery 1006 in a similar manner to that discussed above in relation to FIGS. 8A, 8B and 9.

FIG. 10B is an example of a display screen that might be displayed if the first user's comment 1020 is consistent with the outcome of the event. In this example, the outcome of the event may be determined based on detecting keywords in the audio commentary, ticker text and/or closed caption data. In response to detecting an outcome consistent with the comment 1020, the control circuitry of the user equipment device 1000 generates for output one or more effects. In the examples shown in FIG. 10B, the one or more effects include a visual effect, such as a celebratory message 1024 for presentation on the display screen, and an audio effect, such as an audio clip of cheering, to be output through a speaker 1030. The control circuitry of the user equipment device 1000 may additionally transmit a message to other user equipment devices participating the shared viewing session so that an effect confirming that the first user's comment 1020 was correct can be provided to the other users.

Figure 10C:
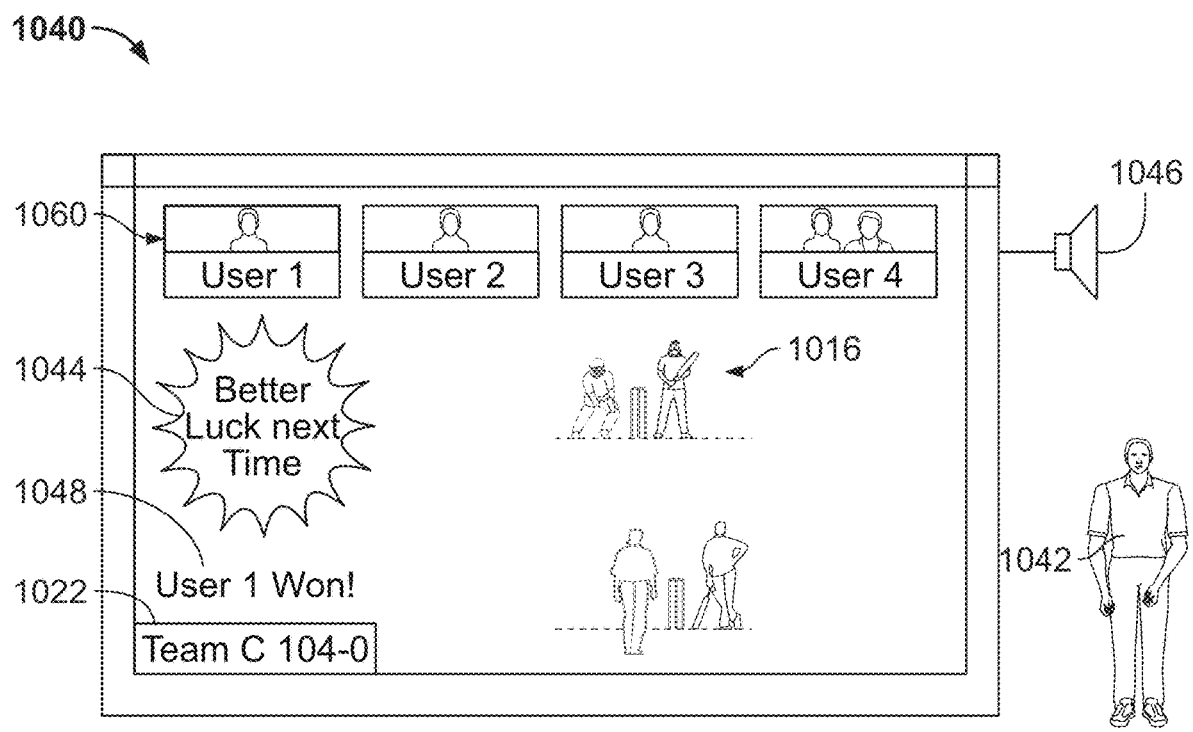

FIG. 10C is an example of a display screen that might be generated for display by control circuitry of a user equipment device of another user who has predicted the outcome of the event incorrectly. In this example, a consolation message 1044, icon or emoji is displayed and/or a corresponding audio effect played through a speaker 1046. In embodiments where a message confirming the first user's successful prediction of the outcome is transmitted to the other user equipment devices, a visual or audio effect 1048 conveying the first user's success may be presented to the other user.

Figure 11:
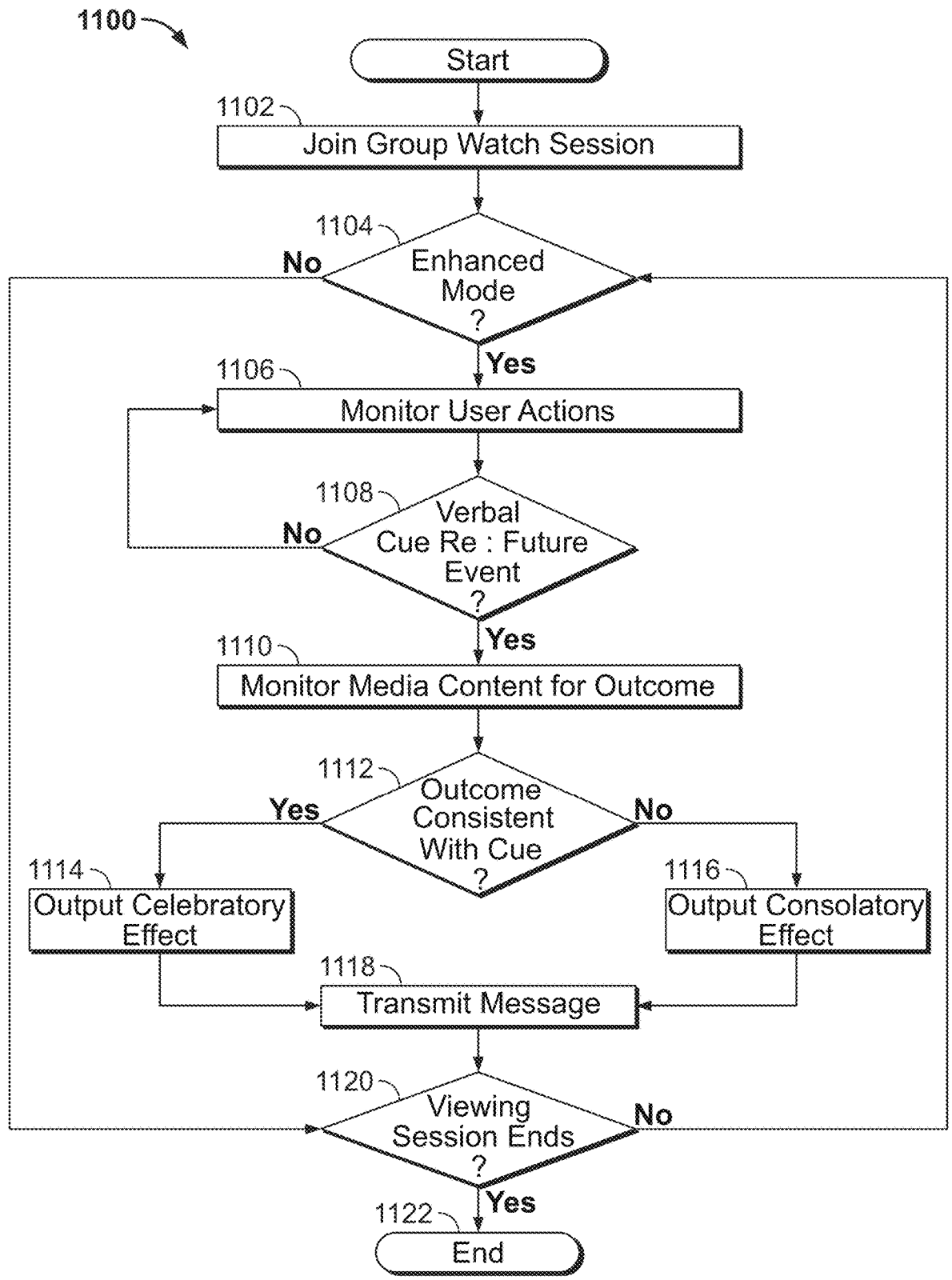
FIG. 11 is a flowchart of a procedure for providing a competition function as shown in FIGS. 10A, 10B & 10C.

FIG. 11 is a flowchart of a procedure for providing a competition function such as that depicted in FIGS. 10A-10C. Starting at step 1100, the user equipment device 1000 joins a group watch session (step 1102) and, if an enhanced interaction mode is activated (step 1102), monitors the actions of the first user (step 1106), for example, by analyzing audio detected by the microphone 1018. In particular, the control circuitry of the user equipment device may process the detected audio to extract words from a comment 1020 by the first user 1002.

The control circuitry of the user equipment device 1000 then determines whether the detected audio includes a verbal cue relating to an outcome of a future event (step 1108), for example, based on keywords such as players' names, scores, types of play, and times extracted from the detected audio. Step 1108 may also include determining whether the future event is one that can be verified by monitoring the media content. For example, the control circuitry of the user equipment device 1000 may have access to a database listing keywords associated with certain types of event and techniques for verifying the outcome of such events and may determine whether the outcome of the future event can be verified based on that information. For example, events such as final scores in a match, timing of certain events such as a first goal in a soccer match, identity of a player who scores the first or next goal may be monitored by, for example, monitoring keywords in closed caption data accompanying the media content, monitoring keywords in a commentary provided in an audio component of the media content, or detecting text in a scoreboard 1022 or player information in a video component of the media content.

If the control circuitry of the user equipment device 1000 determines that the first user's comment 1020 is predicting an outcome of an event that can be verified in such a manner, the control circuitry then monitors the media content (step 1110) to determine whether the first user's comment 1020 is consistent with the outcome of the event. In the example depicted in FIGS. 10A, 10B and 10C, the outcome of the event can be determined based on detecting keywords such as the player's name, "century" or "one hundred" in the audio commentary and/or closed caption data or based on text displayed in the media content confirming that the player 1016 has scored a century, and keywords such as "out" to determine whether the player 1016 is out without having scored a century.

In response to detecting an outcome consistent with the comment 1020 (step 1112), the control circuitry of the user equipment device 1000 generates for output one or more effects corresponding to a successful bet or prediction (step 1114). If, instead, it is determined that the first user's comment was not consistent with the outcome of the event, then one or more effects corresponding to an unsuccessful bet or prediction may be generated for display (step 1116).

Optionally, a message may be transmitted to other user equipment devices in the group watch session to confirm whether or not the first user's comment 1020 was consistent with the outcome (step 1118), so that the other user equipment devices 1040 may display a corresponding message 1048. As discussed above, the other users may have corresponding bets and predictions relating to the same event and may be competing with the first user 1002, and the corresponding message 1048 may confirm the result of that competition.

The control circuitry then returns to monitoring the first user's actions at step 1106 until either the enhanced mode is deactivated (step 1104) or the viewing session finishes (step 1120), ending the process (step 1122).

The foregoing description, for purposes of explanation, used specific nomenclature to provide a thorough understanding of the disclosure. However, it will be apparent to one skilled in the art that the specific details are not required to practice the methods and systems of the disclosure. For example, while FIGS. 4, 5, 7, 9 and 11 refer to a group watch session, the procedures set out in those flowcharts may be applied in other types of shared viewing activity, such as a videocall, videoconference, multi-player game or screen-sharing session. As another example, some of the embodiments described above include determining a portion of a display screen or a user to whom the first user's reaction relates by analyzing captured video of the first user but, in other embodiments, the user equipment device of the first user may include a touch-screen display, and the portion or user may be identified based on a position at which the first user touches the touch-screen display.

The foregoing descriptions of specific embodiments of the present invention are, therefore, presented for purposes of illustration and description. They are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the methods and systems of the disclosure and various embodiments with various modifications as are suited to the particular use contemplated. Additionally, different features of the various embodiments, disclosed or otherwise, can be mixed and matched or otherwise combined so as to create further embodiments contemplated by the disclosure.

This specification discloses embodiments which include, but are not limited to, the following:

1. A method comprising:

generating for display, using control circuitry of a first user equipment device, media content in a shared viewing session;

monitoring, using the control circuitry, actions by a first user of the first user equipment device;

detecting, using the control circuitry, a reaction of the first user based on the monitored actions;

determining, using the control circuitry, a context of the reaction based on the media content and/or user profile information of the first user; and transmitting, to at least a second user equipment device participating in the shared viewing session, a message based on the reaction of the first user and the determined context.

2. The method of embodiment 1, wherein monitoring the actions of the first user comprises:

monitoring, based on output from one or more cameras, physical gestures by the first user; and/or monitoring, via an audio input device, sounds from the first user.

3. The method of embodiment 2, wherein:

monitoring the actions of the first user comprises determining, based on the output from one or more cameras, that the first user is pointing at a first portion of a display screen displaying the media content; and including, in the message, an indication of the first portion of the display screen or an indication of particular content shown in the first portion of the display screen.

4. The method of embodiment 3, further comprising:

receiving, using control circuitry of the second user equipment device, the message from the first user equipment device; and generating for output, using the control circuitry of the second user equipment device, a visual effect highlighting a second portion of the media content corresponding to the first portion indicated by the message.

5. The method of embodiment 1, further comprising:

receiving, using control circuitry of the second user equipment device, the message from the first user equipment device;

generating for output, using the control circuitry of the second user equipment device, one or more of a visual effect, an audio effect or a haptic effect based on the message.

6. The method of embodiment 1, further comprising:

determining, using the control circuitry, at least one of a visual effect, an audio effect or a haptic effect corresponding to the reaction of the first user and the determined context; and including, in the message, an indication the at least one determined effect.

7 The method of embodiment 5, further comprising:

receiving, using control circuitry of the second user equipment device, the message from the first user equipment device;

determining, using the control circuitry of the second user equipment device, based on the received message, at least one of a visual effect, an audio effect or a haptic effect corresponding to the reaction of the first user and the determined context; and generating for output, using the control circuitry of the second user equipment device, the at least one determined effect.

8. The method of embodiment 2, further comprising:

generating for display one or more images of respective other users participating in the shared viewing session;

determining, based on the output from one or more cameras, that the first user is pointing at a third portion of a display screen displaying one of the one or more images; and determining that the image corresponds to a user of the second user equipment device; and wherein the message is transmitted to the second user equipment device in response to determining that the third portion of the display screen corresponds to the user of the second user equipment device.

9. The method of embodiment 2, further comprising:

determining, using the control circuitry, that sounds from the first user received via the audio input include a remark regarding a future event in the media content;

monitoring, using the control circuitry, the media content to determine an outcome of the event;

determining, using the control circuitry, whether the outcome of the event is consistent with the remark;

generating for output, using the control circuitry receiving, an audio effect and/or a visual effect based on whether the outcome is consistent with the remark; and transmitting, to at least a second user equipment device participating in the shared viewing session, a message based on whether the outcome is consistent with the remark.

10. The method of embodiment 4, wherein generating for output the effect comprises transmitting, to a haptic device, an instruction to provide a haptic effect.

11. The method of embodiment 1, wherein the shared viewing session is a group watch session of live media content, a group watch session of on-demand video content, a videocall, a videoconference, a multi-player game or screen-sharing session.

12. A non-transitory computer-readable medium on which are stored computer-readable instructions for:

generating for display, using control circuitry of a first user equipment device, media content in a shared viewing session;

monitoring, using the control circuitry, actions by a first user of the first user equipment device;

detecting, using the control circuitry, a reaction of the first user based on the monitored actions;

determining, using the control circuitry, a context of the reaction based on the media content and/or user profile information of the first user; and transmitting, to at least a second user equipment device participating in the shared viewing session, a message based on the reaction of the first user and the determined context.

13. The computer-readable medium of embodiment 12, wherein the instructions for monitoring the actions of the first user comprise:

instructions for monitoring, based on output from one or more cameras, physical gestures by the first user; and/or instructions for monitoring, via an audio input device, sounds from the first user.

14. The computer-readable medium of embodiment 13, wherein:

the instructions for monitoring the actions of the first user comprise instructions for determining, based on the output from one or more cameras, that the first user is pointing at a first portion of a display screen displaying the media content; and the instructions include instructions for including, in the message, an indication of the first portion of the display screen or an indication of particular content shown in the first portion of the display screen.

15. The computer-readable medium of embodiment 12, further comprising:
  instructions for determining, using the control circuitry, at least one of a visual effect, an audio effect or a haptic effect corresponding to the reaction of the first user and the determined context; and
  instructions to include in the message an indication of the at least one determined effect.
16. The computer-readable medium of embodiment 12, further comprising:
  instructions for generating for display one or more images of respective other users participating in the shared viewing session;
  instructions for determining, based on the output from one or more cameras, that the first user is pointing at a third portion of a display screen displaying one of the one or more images; and
  instructions for determining that the image corresponds to a user of the second user equipment device; and wherein the instructions for transmitting specify that the message is to be transmitted to the second user equipment device in response to determining that the third portion of the display screen corresponds to the user of the second user equipment device.
17. The computer-readable medium of embodiment 13, further comprising:
  instructions for determining, using the control circuitry, that sounds from the first user received via the audio input include a remark regarding a future event in the media content;
  instructions for monitoring, using the control circuitry, the media content to determine an outcome of the event;
  instructions for determining, using the control circuitry, whether the outcome of the event is consistent with the remark;
  instructions for generating for output, using the control circuitry, an audio effect and/or a visual effect based on whether the outcome is consistent with the remark; and
  instructions for transmitting, to at least the second user equipment device, a message based on whether the outcome is consistent with the remark.
18. The computer-readable medium of embodiment 12, wherein the computer readable instructions include instructions for participating in a shared viewing session that is a group watch session of live media content, a group watch session of on-demand video content, a videocall, a video-conference, a multi-player game or screen-sharing session.
19. An apparatus comprising:
  a first user equipment device comprising control circuitry configured to:
    generate for display media content in a shared viewing session;
    monitor actions by a first user of the first user equipment device;
    detect a reaction of the first user based on the monitored actions;
    determine a context of the reaction based on the media content and/or user profile information of the first user; and
    transmit, to at least a second user equipment device participating in the shared viewing session, a message based on the reaction of the first user and the determined context.
20. The apparatus of embodiment 19, further comprising:
  one or more cameras arranged to capture images of physical actions by the first user; and/or
  an audio input device configured to capture verbal cues from the first user.
21. The apparatus of embodiment 20, wherein the control circuitry is further configured to:
  determine, based on the output from one or more cameras, that the first user is pointing at a first portion of a display screen displaying the media content; and
  include, in the message, an indication of the first portion of the display screen or an indication of particular content shown in the first portion of the display screen.
22. A system comprising:
  the apparatus of embodiment 19; and
  the second user equipment device, comprising second control circuitry configured to:
    receive, using control circuitry of the second user equipment device, the message from the first user equipment device; and
    generate for output, using the control circuitry of the second user equipment device, a visual effect highlighting a second portion of the media content corresponding to the first portion indicated by the message.
23. The apparatus of embodiment 20, wherein the control circuitry is further configured to:
  generate for display one or more images of respective other users participating in the shared viewing session;
  determine, based on the output from one or more cameras, that the first user is pointing at a third portion of a display screen displaying one of the one or more images; and
  determine that the image corresponds to a user of the second user equipment device; and
  wherein the message is transmitted to the second user equipment device in response to determining that the third portion of the display screen corresponds to the user of the second user equipment device.
24. A system comprising:
  the apparatus of embodiment 19; and
  a second apparatus comprising second control circuitry configured to receive the message from the first user equipment device and generate for output one or more of a visual effect, an audio effect or a haptic effect based on the message.
25. The system of embodiment 24, further comprising:
  receiving, using control circuitry of the second user equipment device, the message from the first user equipment device;
  determining, using the control circuitry of the second user equipment device, based on the received message, the one or more of a visual effect, an audio effect or a haptic effect corresponding to the reaction of the first user and the determined context.
26. The apparatus of embodiment 20, wherein the control circuitry is further configured to:
  determine that verbal cues from the first user received via the audio input include a remark regarding a future event in the media content;
  monitor the media content to determine an outcome of the event;
  determine, using the control circuitry, whether the outcome of the event is consistent with the remark;
  generate for output an audio effect and/or a visual effect based on whether the outcome is consistent with the remark; and
  transmit, to at least a second user equipment device participating in the shared viewing session, a message based on whether the outcome is consistent with the remark.
27. A method comprising:
  generating for display, using control circuitry of a first user equipment device, media content in a shared viewing session;

monitoring, using the control circuitry, actions by a first user of the first user equipment device;

detecting, using the control circuitry, a reaction of the first user based on the monitored actions;

determining, using the control circuitry, a context of the reaction based on the media content and/or user profile information of the first user; and transmitting, to at least a second user equipment device participating in the shared viewing session, a message based on the reaction of the first user and the determined context.

28. The method of embodiment 27, wherein monitoring the actions of the first user comprises:

monitoring, based on output from one or more cameras, physical gestures by the first user; and/or monitoring, via an audio input device, sounds from the first user.

29. The method of embodiment 28, further comprising:

generating for display one or more images of respective other users participating in the shared viewing session;

determining, based on the output from one or more cameras, that the first user is pointing at a third portion of a display screen displaying one of the one or more images; and determining that the image corresponds to a user of the second user equipment device;

wherein the message is transmitted to the second user equipment device in response to determining that the third portion of the display screen corresponds to the user of the second user equipment device.

30. The method of embodiment 28, wherein:

monitoring the actions of the first user comprises determining, based on the output from one or more cameras, that the first user is pointing at a first portion of a display screen displaying the media content; and including, in the message, an indication of the first portion of the display screen or an indication of particular content shown in the first portion of the display screen.

31. The method of embodiment 29, further comprising:

receiving, using control circuitry of the second user equipment device, the message from the first user equipment device; and generating for output, using the control circuitry of the second user equipment device, a visual effect highlighting a second portion of the media content corresponding to the first portion indicated by the message.

32. The method of any of embodiments 27-31, further comprising:

receiving, using control circuitry of the second user equipment device, the message from the first user equipment device;

generating for output, using the control circuitry of the second user equipment device, one or more of a visual effect, an audio effect or a haptic effect based on the message.

33. The method of any of embodiments 27-31, further comprising:

determining, using the control circuitry, at least one of a visual effect, an audio effect or a haptic effect corresponding to the reaction of the first user and the determined context;

wherein the message includes an indication of the at least one determined effect.

34. The method of any of embodiments 27-30, further comprising:

receiving, using control circuitry of the second user equipment device, the message from the first user equipment device;

determining, using the control circuitry of the second user equipment device, based on the received message, at least one of a visual effect, an audio effect or a haptic effect corresponding to the reaction of the first user and the determined context; and generating for output, using the control circuitry of the second user equipment device, the at least one determined effect.

35. The method of embodiment 28, further comprising:

determining, using the control circuitry, that sounds from the first user received via the audio input include a remark regarding a future event in the media content;

monitoring, using the control circuitry, the media content to determine an outcome of the event;

determining, using the control circuitry, whether the outcome of the event is consistent with the remark;

generating for output, using the control circuitry receiving, an audio effect and/or a visual effect based on whether the outcome is consistent with the remark; and transmitting, to at least a second user equipment device participating in the shared viewing session, a message based on whether the outcome is consistent with the remark.

36. The method of embodiment 32 or 34, wherein generating for output the effect comprises transmitting, to a haptic device, an instruction to provide a haptic effect.

37. The method of any of embodiments 27-36, wherein the shared viewing session is a group watch session of live media content, a group watch session of on-demand video content, a videocall, a videoconference, a multi-player game or screen-sharing session.

38. A computer program comprising computer readable instructions that, when executed by processing circuitry, causes the processing circuitry to perform the method of any of embodiments 27-37.

39. An apparatus comprising a first user equipment device including:

means for generating for display media content in a shared viewing session;

means for monitoring actions by a first user of the first user equipment device;

means for detecting a reaction of the first user based on the monitored actions;

means for determining a context of the reaction based on the media content and/or user profile information of the first user; and means for transmitting, to at least a second user equipment device participating in the shared viewing session, a message based on the reaction of the first user and the determined context.

40. The apparatus of embodiment 39, further comprising:

one or more cameras arranged to capture images of physical actions by the first user; and/or an audio input device configured to capture verbal cues from the first user.

41. The apparatus of embodiment 40, wherein the first user equipment further comprises:

means for determining, based on the output from one or more cameras, that the first user is pointing at a first portion of a display screen displaying the media content;

means for including, in the message, an indication of the first portion of the display screen or an indication of particular content shown in the first portion of the display screen.

42. The apparatus of embodiment 41, further comprising the second user equipment device, the second user equipment device including:

means for receiving the message from the first user equipment device; and means for generating for output a visual effect highlighting a second portion of the media content corresponding to the first portion indicated by the message.

43. The apparatus of embodiment 40 or 41, wherein the first user equipment device comprises:

means for generating for display one or more images of respective other users participating in the shared viewing session;

means for determining, based on the output from one or more cameras, that the first user is pointing at a third portion of a display screen displaying one of the one or more images; and means for determining that the image corresponds to a user of the second user equipment device;

wherein the means for transmitting is configured to transmit the message to the second user equipment device in response to determining that the third portion of the display screen corresponds to the user of the second user equipment device.

44. The apparatus of any of embodiments 39-43, further comprising:

the second user equipment device, comprising means for receiving the message from the first user equipment device and means for generating for output one or more of a visual effect, an audio effect or a haptic effect based on the message.

45. The apparatus of embodiment 44, wherein the second user equipment device further comprises:

means for receiving the message from the first user equipment device; and means for determining, based on the received message, the one or more of a visual effect, an audio effect or a haptic effect corresponding to the reaction of the first user and the determined context.

46. The apparatus of embodiment 40, further comprising:

means for determining that verbal cues from the first user received via the audio input include a remark regarding a future event in the media content;

means for monitoring the media content to determine an outcome of the event;

means for determining, using the control circuitry, whether the outcome of the event is consistent with the remark;

means for generating for output an audio effect and/or a visual effect based on whether the outcome is consistent with the remark; and means for transmitting, to at least the second user equipment device, a message based on whether the outcome is consistent with the remark.

47. The apparatus of any of embodiments 39-46, wherein the shared viewing session is a group watch session of live media content, a group watch session of on-demand video content, a videocall, a videoconference, a multi-player game or screen-sharing session.

What is claimed is:

1. A method comprising:

generating for display, using control circuitry of a first user equipment device, media content in a shared viewing session;

monitoring, using the control circuitry, actions by a first user of the first user equipment device, wherein monitoring the actions of the first user comprises:

monitoring, based on an output from one or more cameras, physical gestures by the first user;

detecting, using the control circuitry, a reaction of the first user based on the monitored actions;

determining, using the control circuitry, a context of the reaction based on the media content and/or user profile information of the first user;

transmitting, to at least a second user equipment device participating in the shared viewing session, a message based on the reaction of the first user and the determined context;

generating for display one or more images of respective other users participating in the shared viewing session;

determining, based on the output from the one or more cameras, that the first user is pointing at a third portion of a display screen displaying one of the one or more images; and determining that the image corresponds to a user of the second user equipment device;

wherein the message is transmitted to the second user equipment device in response to determining that the third portion of the display screen corresponds to the user of the second user equipment device.

2. The method of claim 1, wherein monitoring the actions of the first user comprises:

monitoring, via an audio input device, sounds from the first user.

3. The method of claim 2, wherein:

monitoring the actions of the first user comprises determining, based on the output from the one or more cameras, that the first user is pointing at a first portion of a display screen displaying the media content; and including, in the message, an indication of the first portion of the display screen or an indication of particular content shown in the first portion of the display screen.

4. The method of claim 3, further comprising:

receiving, using control circuitry of the second user equipment device, the message from the first user equipment device; and generating for output, using the control circuitry of the second user equipment device, a visual effect highlighting a second portion of the media content corresponding to the first portion indicated by the message.

5. The method of claim 4, wherein generating for output the effect comprises transmitting, to a haptic device, an instruction to provide a haptic effect.

6. The method of claim 2, further comprising:

determining, using the control circuitry, that sounds from the first user received via the audio input device include a remark regarding a future event in the media content;

monitoring, using the control circuitry, the media content to determine an outcome of the event;

determining, using the control circuitry, whether the outcome of the event is consistent with the remark;

generating for output, using the control circuitry receiving, an audio effect and/or a visual effect based on whether the outcome is consistent with the remark; and transmitting, to at least a second user equipment device participating in the shared viewing session, a message based on whether the outcome is consistent with the remark.

7. The method of claim 1, further comprising:

receiving, using control circuitry of the second user equipment device, the message from the first user equipment device;

generating for output, using the control circuitry of the second user equipment device, one or more of a visual effect, an audio effect or a haptic effect based on the message.

8. The method of claim 7, further comprising:
receiving, using control circuitry of the second user equipment device, the message from the first user equipment device;
determining, using the control circuitry of the second user equipment device, based on the received message, at least one of a visual effect, an audio effect or a haptic effect corresponding to the reaction of the first user and the determined context; and
generating for output, using the control circuitry of the second user equipment device, the at least one determined effect.

9. The method of claim 1, further comprising:
determining, using the control circuitry, at least one of a visual effect, an audio effect or a haptic effect corresponding to the reaction of the first user and the determined context;
wherein the message includes an indication of the at least one determined effect.

10. The method of claim 1, wherein the shared viewing session is a group watch session of live media content, a group watch session of on-demand video content, a video-call, a videoconference, a multi-player game or screen-sharing session.

11. A non-transitory computer-readable medium on which are stored computer-readable instructions for performing the method of claim 1.

12. An apparatus comprising: control circuitry configured to:
generate for display media content in a shared viewing session;
monitor actions by a first user of a first user equipment device;
detect a reaction of the first user based on the monitored actions;
determine a context of the reaction based on the media content and/or user profile information of the first user; and
transmit, to at least a user equipment device participating in the shared viewing session, a message based on the reaction of the first user and the determined context; and
one or more cameras arranged to capture images of physical actions by the first user;
wherein the control circuitry is further configured to:
generate for display one or more images of respective other users participating in the shared viewing session;
determine, based on an output from the one or more cameras, that the first user is pointing at a third portion of a display screen displaying one of the one or more images; and
determine that the image corresponds to a user of the user equipment device;
wherein the control circuitry is configured to transmit the message to the user equipment device in response to determining that the third portion of the display screen corresponds to the user of the user equipment device.

13. The apparatus of claim 12, further comprising:
an audio input device configured to capture verbal cues from the first user.

14. The apparatus of claim 13, wherein the control circuitry is further configured to:
determine, based on an output from the one or more cameras, that the first user is pointing at a first portion of a display screen displaying the media content; and
include, in the message, an indication of the first portion of the display screen or an indication of particular content shown in the first portion of the display screen.

15. A system comprising:
the apparatus of claim 14; and
the user equipment device, comprising second control circuitry configured to:
receive, using control circuitry of the user equipment device, the message from the first user equipment device; and
generate for output, using the control circuitry of the apparatus, a visual effect highlighting a second portion of the media content corresponding to the first portion indicated by the message.

16. The apparatus of claim 12, further comprising:
the user equipment device, comprising second control circuitry configured to receive the message and generate for output one or more of a visual effect, an audio effect or a haptic effect based on the message.

17. The apparatus of claim 16, wherein the second control circuitry is further configured to:
receive, using the second control circuitry, the message from the first user equipment device; and
determine, using the control circuitry of the second user equipment device, based on the received message, the one or more of a visual effect, an audio effect or a haptic effect corresponding to the reaction of the first user and the determined context.

18. The apparatus of claim 16, wherein the control circuitry is further configured to:
determine that verbal cues from the first user received via the audio input device include a remark regarding a future event in the media content;
monitor the media content to determine an outcome of the event;
determine, using the control circuitry, whether the outcome of the event is consistent with the remark;
generate for output an audio effect and/or a visual effect based on whether the outcome is consistent with the remark; and
transmit, to at least the user equipment device participating in the shared viewing session, a message based on whether the outcome is consistent with the remark.

* * * * *